United States Patent
Barbosa

(10) Patent No.: US 10,602,574 B2
(45) Date of Patent: *Mar. 24, 2020

(54) DRIVER CIRCUITS WITH MULTIPLE RECTIFIERS

(71) Applicant: New Energies & Alternative Technologies, Inc., Albuquerque, NM (US)

(72) Inventor: Isaac Ananda Barbosa, Albuquerque, NM (US)

(73) Assignee: New Energies & Alternative Technologies, Inc., Albuquerque, NM (US)

(*) Notice: Subject to any disclaimer, the term of this patent is extended or adjusted under 35 U.S.C. 154(b) by 0 days.

This patent is subject to a terminal disclaimer.

(21) Appl. No.: 16/087,222

(22) PCT Filed: Jun. 12, 2017

(86) PCT No.: PCT/US2017/037065
§ 371 (c)(1),
(2) Date: Sep. 21, 2018

(87) PCT Pub. No.: WO2017/218430
PCT Pub. Date: Dec. 21, 2017

(65) Prior Publication Data
US 2019/0110341 A1 Apr. 11, 2019

Related U.S. Application Data

(63) Continuation-in-part of application No. 15/181,707, filed on Jun. 14, 2016, now Pat. No. 9,681,504.

(51) Int. Cl.
*H05B 33/08* (2020.01)
*A01G 7/04* (2006.01)
(Continued)

(52) U.S. Cl.
CPC ......... *H05B 33/0809* (2013.01); *A01G 9/249* (2019.05); *H02M 7/06* (2013.01);
(Continued)

(58) Field of Classification Search
CPC ................ A01G 7/045; A01G 9/24–26; H05B 33/0809–0818; H02M 2001/0074
See application file for complete search history.

(56) References Cited

U.S. PATENT DOCUMENTS

| 4,379,988 A | 4/1983 | Mattatall |
| 4,563,629 A | 1/1986 | Keiper |

(Continued)

FOREIGN PATENT DOCUMENTS

| WO | WO 02/42682 A1 | 5/2002 |
| WO | WO 2008/041587 A1 | 4/2008 |
| WO | WO 2017/218430 A1 | 12/2017 |

OTHER PUBLICATIONS

Authorized officer Francois Beaugrand, International Search Report/Written Opinion in PCT/US2017/037065 dated Aug. 8, 2017, 18 pages.

(Continued)

*Primary Examiner* — Rexford N Barnie
*Assistant Examiner* — David A Shiao
(74) *Attorney, Agent, or Firm* — Fish & Richardson P.C.

(57) ABSTRACT

In some implementations, a device includes a first full bridge rectifier configured to receive power from an alternating current (AC) power source, the first full bridge rectifier having direct current (DC) output nodes, a second full bridge rectifier configured to receive power from the AC power source, the second full bridge rectifier having DC output nodes, wherein the second full bridge rectifier is coupled to receive AC power in series with the first full bridge rectifier, a first set of light emitting diodes coupled to the DC output (Continued)

nodes of the first full bridge rectifier, and a second set of light emitting diodes coupled to the DC output nodes of the second full bridge rectifier.

20 Claims, 15 Drawing Sheets

(51) Int. Cl.
*H02M 7/06* (2006.01)
*A01G 9/24* (2006.01)
*H02M 1/00* (2006.01)
*A01G 9/26* (2006.01)

(52) U.S. Cl.
CPC ......... *H05B 33/0821* (2013.01); *A01G 7/045* (2013.01); *A01G 9/246* (2013.01); *A01G 9/247* (2013.01); *A01G 9/26* (2013.01); *H02M 2001/0074* (2013.01); *Y02P 60/149* (2015.11); *Y10T 307/445* (2015.04)

(56) References Cited

U.S. PATENT DOCUMENTS

| | | | |
|---|---|---|---|
| 5,912,568 A | 6/1999 | Kiley | |
| 5,962,979 A | 10/1999 | Dejonge | |
| 6,411,045 B1 | 6/2002 | Nerone | |
| 6,948,829 B2 | 9/2005 | Verdes | |
| 7,304,872 B1 | 12/2007 | Yakymyshyn et al. | |
| 8,388,183 B2 | 3/2013 | Miki et al. | |
| 8,408,748 B2 | 4/2013 | Janik et al. | |
| 8,414,153 B2 | 4/2013 | Barta | |
| 9,016,901 B2 | 4/2015 | Janik et al. | |
| 9,267,649 B2 | 2/2016 | Janik et al. | |
| 9,681,504 B1 | 6/2017 | Barbosa | |
| 9,681,511 B1 | 6/2017 | Barbosa | |
| 9,961,736 B2 | 5/2018 | Barbosa | |
| 2002/0191401 A1 | 12/2002 | He | |
| 2006/0076240 A1 | 4/2006 | Neeb | |
| 2007/0103914 A1 | 5/2007 | McCaffrey | |
| 2007/0228999 A1 | 10/2007 | Kit | |
| 2008/0094000 A1 | 4/2008 | Yamamoto et al. | |
| 2008/0252229 A1 | 10/2008 | Wu | |
| 2010/0277067 A1 | 11/2010 | Maxik et al. | |
| 2010/0277069 A1 | 11/2010 | Janik et al. | |
| 2011/0127913 A1 | 6/2011 | Harmgardt et al. | |
| 2011/0175537 A1 | 7/2011 | Horng et al. | |
| 2011/0192082 A1* | 8/2011 | Uchiyama | A01G 9/24 47/66.6 |
| 2011/0198925 A1 | 8/2011 | Yang | |
| 2011/0227489 A1 | 9/2011 | Huynh | |
| 2011/0285289 A1 | 11/2011 | Tremblay et al. | |
| 2011/0316446 A1 | 12/2011 | Kang et al. | |
| 2012/0007514 A1 | 1/2012 | Lin | |
| 2012/0043892 A1 | 2/2012 | Visser et al. | |
| 2012/0049737 A1 | 3/2012 | Kitagawa et al. | |
| 2012/0069606 A1 | 3/2012 | Sagneri et al. | |
| 2012/0081009 A1 | 4/2012 | Shteynberg et al. | |
| 2012/0194094 A1 | 8/2012 | Hsin-Mao et al. | |
| 2012/0256551 A1 | 10/2012 | Kim et al. | |
| 2013/0020951 A1 | 1/2013 | Pollock et al. | |
| 2013/0063043 A1 | 3/2013 | Daniel | |
| 2013/0082611 A1 | 4/2013 | Cohen | |
| 2014/0115958 A1* | 5/2014 | Helene | A01G 9/14 47/17 |
| 2014/0191672 A1 | 7/2014 | Stack | |
| 2014/0232289 A1 | 8/2014 | Brandes et al. | |
| 2014/0265892 A1 | 9/2014 | Chang et al. | |
| 2014/0265903 A1 | 9/2014 | Park et al. | |
| 2015/0054410 A1 | 2/2015 | Sanders et al. | |
| 2015/0062987 A1 | 3/2015 | Chen | |
| 2015/0117076 A1 | 4/2015 | Zhang | |
| 2015/0208476 A1 | 7/2015 | Muramatsu et al. | |
| 2015/0216130 A1* | 8/2015 | Grajcar | A01G 7/045 47/58.1 LS |
| 2015/0264766 A1 | 9/2015 | Takatsu | |
| 2015/0312987 A1 | 10/2015 | Gibbs | |
| 2016/0029578 A1 | 2/2016 | Martin et al. | |
| 2016/0192598 A1 | 7/2016 | Haggarty | |
| 2016/0205739 A1* | 7/2016 | Grajcar | H05B 33/0845 315/210 |
| 2017/0035002 A1* | 2/2017 | Ellins | A01G 9/247 |
| 2017/0094920 A1* | 4/2017 | Ellins | A01G 31/02 |
| 2017/0279368 A1 | 9/2017 | Barbosa | |
| 2017/0280525 A1 | 9/2017 | Barbosa | |

OTHER PUBLICATIONS

Capacitor, From Wikipedia, the free encyclopedia [online] [retrieved on Mar. 24, 2016]. Retrieved from the Internet:https://en.wikipedia.org/wiki/Capacitor, 25 pages.

Diode bridge, From Wikipedia, the free encyclopedia [online] [retrieved on Mar. 24, 2016]. Retrieved from the Internet: https://en.wikipedia.org/wiki/Diode_bridge, 6 pages.

Full Wave Rectifier and Bridge Rectifier Theory [online] [retrieved on Mar. 24, 2016]. Retrieved from the Internet: http://www.electronics-tutorials.ws/diode/diode_6.html, 9 pages.

International Search Report and Written Opinion, in International Application No. PCT/US2017/024050, dated Jul. 7, 2017, 15 pages.

Instructables, "Power LED's-simplest light with constant-current circuit" [online] [retrieved on Mar. 21, 2016]. Retrieved from the Internet: http://www.instructables.com/id/Power-LED-s-simplest-light-with-constant-current/, 14 pages.

Light-emitting diode, From Wikipedia, the free encyclopedia [online] [retrieved on Feb. 15, 2016]. Retrieved from the Internet: https://en.wikipedia.org/wiki/Lightemitting_diode, 34 pages.

Nachbaur, Oliver. "White LED Power Supply Design Techniques," Texas Instruments Deutschland GmbH, Copyright 2003, Texas Instruments Incorporated, 8 pages.

Rectifier, From Wikipedia, the free encyclopedia [online] [retrieved on Mar. 24, 2016]. Retrieved from the Internet: https://en.wikipedia.org/wiki/Rectifier, 18 pages.

U.S. Non-Final Office Action for U.S. Appl. No. 15/081,022 dated Jul. 28, 2016, 22 pages.

U.S. Non-Final Office Action for U.S. Appl. No. 15/081,022 dated Mar. 23, 2017, 29 pages.

U.S. Non-Final Office Action for U.S. Appl. No. 15/081,039 dated Jun. 9, 2016, 19 pages.

U.S. Non-Final Office Action for U.S. Appl. No. 15/181,707, dated Sep. 12, 2016, 15 pages.

U.S. Notice of Allowance for U.S. Appl. No. 15/081,039 dated Feb. 9, 2017, 10 pages.

U.S. Notice of Allowance for U.S. Appl. No. 15/081,039 dated Oct. 7, 2016, 13 pages.

Voltage ratings on electrolytic capacitors? [online] [retrieved on Mar. 24, 2016]. Retrieved from the Internet: http://forum.allaboutcircuits.com/threads/voltage-ratings-on-electrolytic-capacitors.47903/, 22 pages.

U.S. Non-Final Office Action for U.S. Appl. No. 15/389,905, dated Jul. 14, 2017, 27 pages.

* cited by examiner

DRIVER CIRCUITS WITH MULTIPLE RECTIFIERS

CROSS-REFERENCE TO RELATED APPLICATION

This application is a continuation-in-part of U.S. patent application Ser. No. 15/181,707, filed on Jun. 14, 2016, issued as U.S. Pat. No. 9,681,504, the entire contents of which is incorporated by reference herein.

BACKGROUND

The present specification relates to power supplies and driver circuits that can supply power to loads, such as motors, light emitting diodes (LEDs), and other devices.

Various types of electrical devices include power supply circuits to provide the power needed for operation. Different electrical devices have different voltage and current needs. Motors, LEDs, and other components may operate using direct current (DC) power, but operating these components from an alternating current (AC) power source may be desirable. LEDs are semiconductor light sources that are used in a variety of applications. LEDs are general more efficient than incandescent or fluorescent bulbs, and different types of LEDs can produce different colors of light.

SUMMARY

In some implementations, a device includes a rectifier to convert AC input to DC output that drives a DC load. The device also drives one or more AC loads coupled in series with the rectifier to receive the AC current flowing through the rectifier. Additional rectifiers, with respective DC loads, can be coupled in series through AC nodes. For example, multiple rectifiers can be connected to AC power in series so that the same AC current flows through each of the multiple rectifiers. The multiple rectifiers can each provide a separate DC output to drive DC loads. One or more other AC loads may be connected in series with the multiple rectifiers so the AC loads also share same AC current as the rectifiers. In some instances, the rectifiers may be full bridge diode rectifiers.

Implementations of the circuits and devices discussed in the application can provide a number of advantages. For example, the circuits can be used to drive LEDs to provide increased lumen output, limit overall power consumption, and improve efficiency. As another example, multiple different types of light sources and other loads can be driven using a relatively low number of components and at a low cost of materials. Two or more bridge rectifiers can be arranged so that current flows directly from one bridge rectifier to another bridge rectifier through one or more loads. Examples of appropriate loads include, for example, a DC motor, lighting such as fluorescent, UV, or LEDs, a fan, and a heating pad. In some instances, the ability to drive multiple loads in a simple arrangement allows a single circuit to drive different light sources, as well as a fan to cool the light sources or potentially other loads. The use of multiple rectifiers also provides modularity and redundancy, allowing modules to be easily replaced or switched if desired.

In some implementations, a device includes a first full bridge rectifier configured to receive power from an alternating current (AC) power source, the first full bridge rectifier having direct current (DC) output nodes, a second full bridge rectifier configured to receive power from the AC power source, the second full bridge rectifier having DC output nodes, wherein the second full bridge rectifier is coupled to receive AC power in series with the first full bridge rectifier, a first set of light emitting diodes coupled to the DC output nodes of the first full bridge rectifier, and a second set of light emitting diodes coupled to the DC output nodes of the second full bridge rectifier.

In some implementations, the first set of LEDs can include multiple light emitting diodes in series and the second set of light emitting diodes can include multiple light emitting diodes in series. The first set of light emitting diodes may have a first set of spectral output characteristics and the second set of light emitting diodes may have a second set of spectral output characteristics different from the first set of spectral output characteristics.

In some implementations, the device can include capacitors coupled to the DC output nodes of the first full bridge rectifier. The device can include capacitors coupled to the DC output nodes of the second full bridge rectifier. The device can include a fuse coupled to a DC output node of the first full bridge rectifier and one of the first set of light emitting diodes. The device can include a fuse coupled to a DC output node of the second full bridge rectifier and one of the second set of light emitting diodes.

In some implementations, the device can include a load coupled in series between an AC node of the first rectifier and an AC node of the second rectifier. The load can include at least one of: a motor, a pump, a fan, a light, a heating pad, a variable resistor, or a photosynthetically active radiation measurement device. The load can include a fan configured to cool the first set of light emitting diodes and the second set of light emitting diodes or to filter the air. The load can include a UV light bulb. The load can include fluorescent light bulb. The load can include a high-intensity discharge lamp, such as a mercury-vapor lamp. A starter, ignitor, or induction driver appropriate for the lamp can also be included in the device.

In some implementations, the device can include multiple loads, connected in parallel with each other, coupled in series between an AC node of the first rectifier and an AC node of the second rectifier. The device can include one or more switches configured to selectively connect and disconnect AC power to one or more of the multiple loads connected in parallel. In some implementations, the multiple loads are connected so that at least one load remains coupled between the AC nodes of the rectifiers to complete the circuit. For example, the switches may be arranged to selectively disconnect of one or more, but not all, of the multiple loads.

In some implementations, the first set of light emitting diodes may have a first light color temperature and the second set of light emitting diodes may have a second light color temperature different from the first light color temperature.

In some implementations, the device may be a modular system having two or more modules such that the first full bridge rectifier and the first set of light emitting diodes are packaged into a first module and the second full bridge rectifier and the second set of light emitting diodes are packaged into a second module and each of the two or more modules is independently removable.

In some implementations, the device may include one or more additional full bridge rectifiers configured to receive power from the AC power source, each of the one or more additional full bridge rectifiers having DC output nodes, wherein each of the one or more additional full bridge rectifiers is coupled to receive AC power in series with the first full bridge rectifier and the second full bridge rectifier.

In some implementations, the device may be a grow light hood. The device may include two or more resistors, connected such that current flows through one resistor before flowing through another resistor, coupled across the DC output nodes of the first full bridge rectifier such that the one or more resistors dissipate energy.

In some implementations, the device includes a first AC load, a second AC load, and one or more switches arranged such that, when the one or more switches are closed, the first AC load and the second AC load are (i) coupled in parallel with each other and (ii) coupled to receive AC power in series with the first full bridge rectifier and the second full bridge rectifier.

In some implementations, the one or more switches are arranged such that, when the one or more switches are opened, (i) the first AC load remains coupled in series with the full bridge rectifier and the second full bridge rectifier, and (ii) the second AC load is disconnected from being coupled in parallel to the first AC load, such that the second AC load is disconnected from power while the first AC load, the first full-bridge rectifier circuit, and the second full-bridge rectifier remain powered.

In some implementations, the one or more switches are arranged such that at least one of the first AC load and the second AC load is connected in series with the first full-bridge rectifier and the second full-bridge rectifier and is arranged to transmit AC current between the first full-bridge rectifier and the second full-bridge rectifier regardless whether one or more switches are open or closed, and at least one of the first AC load and the second AC load is selectively connected to or disconnected from being coupled in series with the first full-bridge rectifier and the second full-bridge rectifier depending on whether the one or more switches are open or closed.

In some implementations, when first full-bridge rectifier and the second full-bridge rectifier are connected to power and the one or more switches are open, the first AC load is powered and the second AC load is not powered. And, when first full-bridge rectifier and the second full-bridge rectifier are connected to power and the one or more switches are closed, the first AC load is powered and the second AC load is also powered, with the second AC load being connected in series between the first full-bridge rectifier and the second full-bridge rectifier and with the second AC load being connected in parallel with the first AC load.

In some implementations, the device is configured so that at least one of the first AC load and the second AC load is connected in series with the first full-bridge rectifier and the second full-bridge rectifier and is arranged to transmit AC current between the first full-bridge rectifier and the second full-bridge rectifier for all positions of the one or more switches.

In some implementations, at least one of the first AC load or the second AC load includes at least one of: a fan, a motor, a pump, or a heating element. In some implementations, the one or more switches are arranged such that opening at least one of the one or more switches disconnects the second AC load from being coupled in series with the first full bridge rectifier while the first AC load remains coupled in series with the first full bridge rectifier and the second full bridge rectifier.

In some implementations, the device includes multiple switches each configured to selectively connect or disconnect a different AC load from being coupled in series with the first full-bridge rectifier and the second full-bridge rectifier, and the device includes at least one AC load that has a fixed, unswitched connection in series with the first full-bridge rectifier and the second full-bridge rectifier. In some implementations, the at least one AC load is lighting element, a fan, a motor, a pump, or a heating element.

In some implementations, the device is configured so that the only path of AC current from the first full-bridge rectifier to the second full-bridge rectifier extends through one or more AC loads. In some implementations, the device has multiple AC loads each connected through a switch that selectively connects and disconnects the corresponding AC load in series with the first full-bridge rectifier and the second full-bridge rectifier independent of the connections of the other AC loads.

In some implementations, a method includes: receiving alternating current input in a driver circuit; rectifying the alternating current in a first full-bridge rectifier of the driver circuit and a second full-bridge rectifier of the driver circuit that is connected in series with the first full-bridge rectifier, the rectifiers being coupled such that the alternating current passing through the first full-bridge rectifier also passes through the second full-bridge rectifier; powering a first set of one or more light emitting diodes with DC output of the first full-bridge rectifier; and powering a second set of one or more light emitting diodes with DC output of the second full-bridge rectifier.

Implementations can include one or more of the following features. For example, the method may include driving the first AC load and the second AC load with the driver circuit in response to closing the one or more switches. Driving the one or more AC loads can include operating one or more fans configured to cool the first set of light emitting diodes and the second set of light emitting diodes or to filter air. Driving the one or more AC loads can include providing an AC load in series with the first full-bridge rectifier and the second full-bridge rectifier, wherein the AC load limits the power provided to the first set of light emitting diodes and the second set of light emitting diodes.

In some implementations, before closing the one or more switches, the method includes driving the first AC load in series with the first full-bridge rectifier and the second full-bridge rectifier while not driving the second AC load, wherein the AC load limits the power provided to the first set of light emitting diodes and the second set of light emitting diodes.

In some implementations, the method includes closing one or more switches to (i) couple a first AC load and a second AC load in parallel with each other and (ii) couple the first AC load and the second AC load to receive power in series with the first full-bridge rectifier and the second full-bridge rectifier. The method can include opening the one or more switches to disconnect the second AC load from power while the first AC load, the first full-bridge rectifier and the second full-bridge rectifier remain powered. The driver circuit can include the device of any of the previous implementations.

In another aspect, an enclosure includes: one or more doors that, when closed, seal the enclosure; at least one compartment that is sealed when the one or more doors are shut; a storage device configured to store a substance for supporting one or more life forms placed in the at least one compartment; a dispenser configured to dispense the substance into the at least one compartment at a predetermined rate; and a power unit that powers a first set of light emitting diodes and a second set of light emitting diodes are arranged to provide light within the enclosure. The power unit may include features of any of the circuits of the aspects above, or of any other driver circuits and devices discussed herein.

In some implementations, the enclosure includes a display unit that displays a current value of an environmental characteristic within the housing.

In some implementations, the enclosure includes a control unit, wherein the control unit controls the first set of light emitting diodes, the second set of light emitting diodes, and one or more AC loads connected in series with the first full bridge rectifier and the second full-bridge rectifier.

In some implementations, the display unit and the control unit are powered by the power unit.

In some implementations, the first set of light emitting diodes is coupled to an interior wall of the at least one compartment or the one or more doors.

In some implementations, the dispenser is configured to dispense the substance at a user programmable rate.

In some implementations, the at least one compartment is defined by at least one divider that, when attached to the housing, seals the compartment from another environmentally controlled compartment of the enclosure.

In some implementations, the enclosure includes multiple compartments that are each configured to be independently receive different intensities and durations of light.

In some implementations, a control unit of the enclosure is configured to activate the first set of light emitting diodes and the second set of light emitting diodes according to a predetermined pattern while the one or more doors are closed.

In some implementations, the first set of light emitting diodes and the second set of light emitting diodes are arranged to provide light to different compartments of the enclosure.

In some implementations, the enclosure includes a carbon air filter configured to filter air entering or exiting the enclosure.

In some implementations, the enclosure includes a high-efficiency particulate air (HEPA) filter configured to filter air entering or exiting the enclosure.

In some implementations, the one or more doors seal the housing hermetically. In some implementations, the enclosure comprises a hydroponic mister powered by the power unit. In some implementations, the enclosure comprises a watering system powered by the power unit.

In some implementations, the enclosure comprises a fan powered by the power unit.

In some implementations, the enclosure comprises a heater that heats air in the enclosure or an air conditioning unit that cools air in the enclosure.

In some implementations, the second set of light emitting diodes is placed on at least one wall that defines the at least one compartment of the housing, and the second set of light emitting diodes is configured to output light into the at least one compartment while the one or more doors are closed.

In some implementations, the second set of light emitting diodes is placed on a wall of the housing, and at least one divider between the at least one compartment and another compartment is removable without removing the first set of light emitting diodes or the second set of light emitting diodes.

In some implementations, the first set of light emitting diodes is controlled separately from the second set of light emitting diodes. In some implementations, the at least one divider seals the at least one compartment with a water-tight seal.

In some implementations, the enclosure includes at least two compartments, wherein the enclosure is configured to maintain each of the compartments at a different temperature, humidity, light level, or other environmental condition relative the other compartment.

In some implementations, the at least one compartment comprises a drawer. In some implementations, the enclosure includes external features configured to nest into external features of a second enclosure, such that the enclosures are secured when stacked.

In some implementations, the power unit powers components that regulate an environment of a first compartment of the at least one compartment, and wherein a second, separate power unit powers components that regulate an environment of a second compartment of the at least one compartment.

In some implementations, a control unit of the enclosure controls switching elements of the power unit to selectively power on and power off different AC loads, the switching elements being configured to couple a corresponding AC load in series with the first full bridge rectifier and the second full bridge rectifier of the power unit.

Other features and variations of the method may include powering devices using the techniques discussed below.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
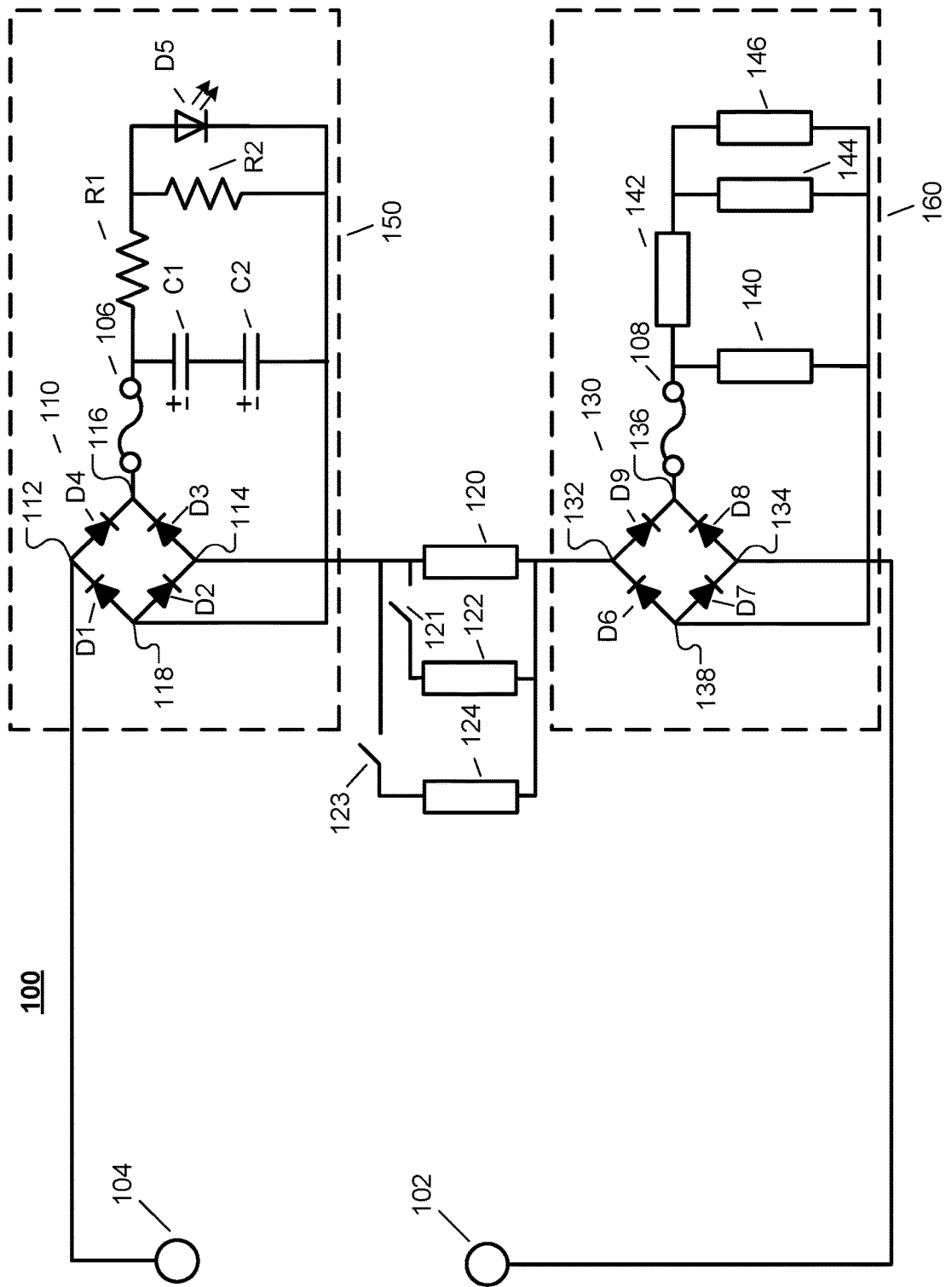
FIG. 1 is a diagram of an example driver circuit with multiple rectifiers.

FIG. 1A is a diagram of an example driver circuit 100 with multiple rectifiers. In this example, the circuit 100 is a circuit arranged to efficiently power LEDs. The circuit 100 is configured to turn on one or more LEDs to produce light. The circuit 100 includes multiple full-bridge rectifiers in series with each other, so that alternating current (AC) current passing through one of the rectifiers also passes through the other rectifier. The rectifiers are also connected in series with an AC load between the rectifiers, so that AC current through the rectifiers also passes through the AC load. The example circuit 100 includes live and neutral terminals of an AC power source, light emitting diodes, multiple full-bridge rectifiers, resistors, a fuse, and capacitors. While the circuit 100 is illustrated and described as providing DC power to a load including LEDs, the circuit 100 may be used to provide power to other loads in addition to or instead of LEDs.

The circuit 100 can be used to drive LEDs in various applications. For example, the circuit 100 can be used to drive LEDs that provide light for plant growth, e.g., a grow light. It can be useful in grow lights and other applications to provide multiple different spectra of light. For example, different sets of LEDs having different output characteristics can be used together to provide overall light output that is broader or more balanced than individual LEDs can provide. Alternatively, different sets of LEDs may be used to increase light output in certain portions of a spectrum, or to adjust the balance between two or more spectra as desired. As discussed below, different sets of LEDs or other DC loads can be driven by different rectifiers. For example, two or more bridge rectifiers can be coupled between AC terminals so that current flows directly from one bridge rectifier to another bridge rectifier. The arrangement can provide a cost-effective solution that uses a relatively small number of inexpensive components to efficiently produce light having desired characteristics.

The use of multiple rectifiers connected as shown in the circuit 100 can provide various benefits. As discussed above, it can enhance the flexibility of the circuit 100 to drive different sets of LEDs, including LEDs which may have differing characteristics. While identical sets of LEDs can be used for different rectifiers, in some instances different sets of LEDs are used. Each rectifier and associated components may be tailored for the particular characteristics of the LEDs that it drives. Different rectifiers or DC drive sections can provide different electrical characteristics, e.g., different voltages, capacitance, current bias, turnoff times, etc., as needed to drive different LEDs or other DC loads. As another example, the use of multiple rectifiers can spread heat and wear across the different rectifiers, which increases the ability of the circuit 100 to dissipate heat, allows the use of components with lower current ratings, and increases component lifespan. The arrangement also allows the circuit 100 to drive multiple sets of LEDs that may be physically spread apart, with a rectifier located near each set of LEDs. The use of multiple rectifiers can also increase the ease of maintenance and enhance functioning in case of failure. Different rectifiers and associated components can be arranged in different modules 150, 160 which can be easily replaced when damaged or when different capabilities are needed. Further, failures of components in one module can be isolated from other modules. Other modules can remain active while the module experiencing a failure can be quickly identified.

In further detail, the example circuit 100 includes a live terminal 102 and a neutral terminal 104 to couple with an AC power source. For example, the terminals 102, 104 can represent electrical connectors, such as prongs of an AC power cable or contacts in an AC power socket, to connect to an electrical outlet. As another example, the circuit 100 may be housed in a light bulb, and so the terminals may be electrical contacts of a screw-type light bulb base that is configured to be inserted into a standard Edison-type light bulb socket. Examples of AC power sources include, for example, 110V-120V (RMS) power or 220V-240V (RMS) power.

The circuit 100 includes two full wave rectifiers that each provide DC output during both halves of the AC power cycle. For example, the circuit 100 includes full-bridge rectifiers 110 and 130 connected in series. Each rectifier 110, 130 rectifies the power of the AC power source and provides direct current (DC) power to a different set of components. One or more AC loads 120, 122, 124 are also included in series with the rectifiers 110, 130. In the example of FIG. 1, AC loads are placed between the two rectifiers 110, 130 so all AC current flowing through the rectifiers 110, 130 also flows through the one or more AC loads 120, 122, 124.

The two rectifiers 110, 130 can be arranged in different modules 150, 160, where each module 150, 160 includes a rectifier, associated components, and a DC load. The circuit 100 includes a module 160. In some instances, the modules 150, 160 may be a self-contained modules that each drives a different load, e.g., the circuit elements D5 and 146, respectively. In the example of FIG. 1, the module 150 includes the full-bridge rectifier 110, the fuse 106, the capacitors C1 and C2, the resistors R1 and R2, and the LED D5. The module 160 includes the full-bridge rectifier 130, the fuse 108, and elements 140, 142, 144, and 146.

In module 150, the full-bridge rectifier 110 includes diodes D1, D2, D3, and D3. Node 112 between the diodes D1 and D4 and node 114 between the diodes D2 and D3 are AC nodes of the full-bridge rectifier 110. Node 116 between the diodes D3 and D4 and node 118 between the diodes D1 and D2 are DC nodes of the full-bridge rectifier 110.

The module 150 includes a fuse 106 connected in series between a DC node of the full-bridge rectifier 110 (e.g., the node 116) and a capacitor C1 and a resistor R1. The fuse 106 is placed such that it does not allow power to flow through the capacitors C1, C2 when the fuse 106 is tripped, preventing failures in which the capacitors C1, C2 might explode and cause damage to the rest of the circuit 100. The fuse 106 also prevents excessive current from damaging the LED D5. The fuse 106 may have any appropriate current rating, for example, a rating of 1A, 5A, 10A, 20A, 30A, etc. depending on the specific circuit components used. The fuse 106 may come in any of a number of forms, for example, the fuse 106 may be a cartridge fuse, a surface mount fuse, an industrial power fuse, a UL fuse, an automotive fuse, etc. In some implementations, in addition to or instead of a fuse 106, a low-resistance resistor can be used to provide overcurrent protection to the circuit 100.

The full-bridge rectifier 110 is connected in series, at an AC node of the full-bridge rectifier 110 (e.g., the node 114), to the full-bridge rectifier 130, at an AC node of the full-bridge rectifier 130 (e.g., the node 132) through the AC loads 120, 122, and/or 124. The full-bridge rectifier 130 is connected, at the other AC node (e.g., the node 134) of the full-bridge rectifier 130, to the live terminal 102.

The module 150 includes capacitors C1, C2 connected in series with the DC output of the rectifier 110 connected across the capacitors C1, C2. The capacitors C1, C2 filter the DC output of the rectifier 110 to smooth ripple in the output voltage. The series arrangement of the capacitors C1 and C2 can reduce the impact of voltage surges across the circuit 160. Additionally, the use of two capacitors in series spreads the total voltage drop across two capacitors, which allows the voltage drop and heat generation for each capacitor to be less than if a single capacitor was used. This can allow the use of capacitors with lower voltage ratings and/or improve the lifespan of the capacitors. In some implementations, the capacitors C1 and C2 may have the same or roughly similar capacitance, e.g., the capacitance of one capacitor is within at least 50% of the capacitance of the other. In other implementations, one capacitor may be much smaller than the other.

The module 150 includes resistors R1 and R2 connected in series. The resistor R1 is connected at one end to the fuse 106 and the capacitor C1, and connected at the other end to the resistor R2. The combination of the resistors R1 and R2 connected in series is connected in parallel across the DC nodes of the full-bridge rectifier 110 (e.g., the nodes 116 and 118).

The resistor R1 is connected in series with the series-connected LEDs and reduces the effect of voltage surges on the LEDs as well, as discussed above. In some examples, the resistors R1 and R2 are placed in parallel with the capacitors C1 and C2 and act as drains for the capacitors. For example, if the circuit 100 or the module 150 is removable, e.g., a removable module or a light bulb, there could be a risk that a user may receive a shock when removing the circuitry while the capacitors C1 or C2 are charged. By draining the charge from the capacitors C1 and C2, the resistors R1 and R2 can reduce the risk of an electrical shock to a user.

The resistor R2 is connected in parallel with the capacitors C1 and C2 and an LED D5. The resistor R2 pulls down the voltage of the circuit 100 and allows the circuit 100 to turn off more quickly than if no resistor were used. For example, if a switch connected to the circuit 100 is flipped, the RC time constant of the resistor R2 and the capacitors C1 and C2 may be small enough to discharge the capacitor C2 quickly and reduce the delay in turning off the LED D5.

When arranged in parallel with the capacitors C1 and C2, the resistor R2 also lessens the effect of voltage surges on the circuit 100. The resistor R2 can reduce the risk of damage to the LEDs or other components of the circuit 100 by providing an alternate path for current and limiting current increases through the LEDs when a high transient voltage is applied the circuit 100.

The module 150 includes one or more LEDs, represented in FIG. 1 as diode D5, connected across DC nodes 116 and 118 of the full-bridge rectifier 110. The LED D5 can be any appropriate number of diodes. While a single LED may be used as a load in some instances, the circuit 100 may also include a plurality of series-connected LEDs. For example, 2, 5, 9, 18, 40, 100, etc. or another number of LED elements may be included. The LEDs may be individual LED elements, packaged separately, or may be diode elements combined into an LED chip. For example, a single chip or package may include 10, 20, or 40 LED elements mounted to a substrate such as a circuit board. In some implementations, the LED D5 includes multiple LED elements that each have substantially the same load characteristics, e.g., turn-on voltage, voltage-current response curve, output spectrum, and so on. The LED D5 may also represent multiple types of LED elements with different characteristics, including multiple sets of LEDs connected in parallel.

The arrangement of the module 150 is shown for purposes of example, and may include more or fewer components than are illustrated. Many variations are possible, as discussed with respect to module 160.

The module 160 includes the second full-bridge rectifier 130, which is connected in series with the first full-bridge rectifier 110 through the AC loads 120, 122, and/or 124. The full-bridge rectifier 130, which includes D6, D7, D8, D9, and D10. Node 132 between the diodes D6 and D9 and node 134 between the diodes D7 and D8 are AC nodes of the full-bridge rectifier 130. Node 136 between the diodes D8 and D9 and node 138 between the diodes D6 and D7 are DC nodes of the full-bridge rectifier 130.

In module 160, a fuse 108 is connected in series between a DC node of the full-bridge rectifier 130 (e.g., the node 136) and a circuit element 140 and a circuit element 142. The fuse 108 may share characteristics with the fuse 106. In some examples, the fuse 108 may have the same rating and characteristics as the fuse 106. In other examples, the fuse 108 may have a different rating and/or a different characteristics from the fuse 106.

In some examples, the fuses 106 and 108 may be thermal resistors, e.g., thermistors in which resistance increases with temperature. For example, if a component begins to draw excessive current, the thermal resistor fuse 106 may add resistance to the circuit 100 as it heats up to prevent overcurrent damage to other components of the circuit 100.

The module 160 includes circuit elements 140, 142, 144, and 146. Each of the elements 140, 142, 144, and 146 can be various circuit components or circuit assemblies, including: wires, resistors, capacitors, diodes, LEDs, etc., with various values for resistance, capacitance, maximum voltage, etc. In some implementations, the elements 140, 142, 144, and 146 can each be a single component or multiple components, arranged in various ways. For example, the element 140 can represent a wire, a single capacitor, two capacitors arranged in parallel, two capacitors arranged in series, or other arrangements of components, depending on the design of the circuit. Different combinations of circuit elements and different values of the components can provide different levels of power consumption, efficiency, and longevity according to different circuit requirements.

In some implementations, the module 160 is identical to the module 150. For example, the circuit element 140 corresponds to the capacitors C1 and C2 the circuit element 142 corresponds to the resistor R1, the circuit element 144 corresponds to the resistor R2; and the circuit element 146 corresponds to the LED D5. In each of these examples, the circuit elements 140, 142, 144, and 146 may have the same or similar characteristics and functionality as their respective counterparts. For example, the circuit element 140 may be two capacitors connected in series with the same capacitance values as the capacitors C1 and C2, respectively.

In some implementations, one or more of the circuit elements 140, 142, 144, and 146 may differ from the components of the module 150. For example, the DC load represented by element 146 may be a different number or type of LEDs, such as LEDs with different output spectra. In some examples, the circuit element 146 may be a number of various lighting elements. For example, the circuit element 146 may be one or more LEDs having a spectrum different from the LED D5. In some examples, the circuit element 146 may be a UV LED, and may provide a different spectrum to plants growing under the influence of the circuit 100. In some instances the element 146 may be a load other than a light source. Similarly, the resistors may be omitted, so that element 142 is a wire, and element 144 is omitted or is a capacitor. As another example, element 140 may be any of various arrangements of capacitors, including a single capacitor or multiple capacitors in series or in parallel.

The circuit 100 includes AC loads 120, 122, and 124 connected in series with the modules 150, 160. The AC loads 120, 122, and 124 generally provide resistance and bias the circuit 100. The AC loads 120, 122, 124 may also enhance the control and operation of the circuit 100. For example, one of the AC loads can be a fan that cools the LEDs or other loads driven by the DC outputs of the rectifiers 110, 130. The number and type of AC loads connected may adjust the amount of AC current through circuit 100, and thus adjust the brightness of LEDs driven by the rectifiers 110, 130. For example, connecting additional AC loads in parallel generally makes the LEDs brighter, by increasing the AC current which in turn increases the DC current through the LED D5. This can increase light output allowing a user to adjust and customize the magnitude and spectra of light output. For example, plants may need a dimmer light in the beginning of a growing cycle and a brighter light at the end.

The AC loads 120, 122, and 124 may be any of a number of various loads. For example, the AC load 120 may be a motor, a fan that cools the circuit 100 (e.g., the DC loads D5, 146), a pump, a heating element, etc. The AC loads may facilitate the growing of plants, for example, with a heating element that warms soil, a pump that provides water or nutrients, and/or an additional light source. In some examples, the AC loads 122 and 124 may be LED modules, UV bulbs, fluorescent bulbs, etc. For a vegetative or flowering plant, loads such as UV bulbs may be switched on during a bloom cycle, providing UV light to the plants.

The use of the AC loads 120, 122, and 124 may provide advantages such as reducing heat generation in components of the circuit 100, such as the LED D5, by setting an appropriate AC current level through the circuit 100. In some examples, the characteristics of the AC loads 120, 122, and 124 may be chosen to build in resistance to the circuit 100 and adjust the operation of the AC loads 120, 122, and 124. For example, the AC load 120 may be a fan, and the characteristics of the AC loads 120, 122, and 124 may be chosen to set the speed of the fan as well as provide a base level of intensity of output from the LEDs.

In some examples, the AC load 120 may be a heating pad. For example, the AC load 120 may be a heating pad that provides heat to roots of plants growing under the influence of the circuit 100. The length of coil in the AC load 120 may be selected to provide a specific resistance designed to drive the circuit 100 efficiently. For example, the length of coil in the AC load 120 may be selected to drive the LED D5 to produce a particular lux (lumen per square meter).

In some examples, the AC load 120 may be a potentiometer with an adjustable contact that forms an adjustable voltage divider. For example, the AC load 120 may be a linear, rotating, sliding, etc. potentiometer. The AC load 120 may be any of a number of variable or adjustable resistive loads. In some examples, the AC load 120 is a potentiometer placed between the full-bridge rectifiers 110 and 130. The AC load 120 may act as a resistive load to the circuit 100 in addition to limiting the energy used to drive the circuit 100. The AC load 120 may allow a user to adjust the power delivered to the components of the circuit 100 from completely off to completely on, and various states in between. A user can adjust the brightness of an LED of the circuit 100 (e.g., the LED D5) to conserve energy and operate the circuit 100 efficiently.

In some examples, characteristics of the AC load 120 may be chosen to cooperate with the other components of the circuit 100. For example, the AC load 120 may have a high current rating due to the amount of AC current the AC load 120 is directing. In some examples, the number of full-bridge rectifiers in the circuit 100 is increased, allowing the AC load 120 to have a lower current rating—while the current across the circuit 100 may be significant, the additional voltage drops across the full-bridge rectifiers reduce the voltage across the AC load 120. In some examples, the number of diodes in the circuit 100 is increased, the ratings of the diodes in the circuit 100 is changed, etc. to limit current through the circuit 100. In some examples, multiple LEDs or full-bridge rectifiers placed in the circuit 100 and having a particular rating allows a user to control dimming of the circuit 100 from full output to no output.

The AC loads 120, 122, and 124 may be chosen by a manufacturer such that the circuit 100 operates as a turnkey system, and a user may begin using the circuit 100 without having to make component choices to achieve the desired light output.

In some examples, the characteristics and values of other components of the circuit 100 may be chosen based on the characteristics of the AC loads 120, 122, and 124. For example, if the AC load 120 is a motor with a high impedance and low resistance, and thus draws a large amount of current, the resistors R1 and R2 may be chosen to mitigate the effects of the relatively high current permitted by the AC load 120 and prevent overcurrent damage to other components of the circuit 100, such as the LED D5 and 146.

In some examples, additional loads may be added in series with the AC loads 120, 122, and 124. For example, additional modules with LEDs may be added to the circuit 100 to provide additional resistance. Additional LEDs added to the different modules of the circuit 100 to also reduce the possibility of overdriving components of the circuit 100.

The circuit 100 can include switches 121, 123 that allow a user to manually connect or disconnect AC loads. In some examples, the circuit 100 includes a switch in series with each of the AC loads 122 and 124. By changing the position of the switches 121, 123, a user can complete or break the portion of the circuit connecting the respective loads in parallel to the rest of circuit 100. The user may connect one, both, or neither of the AC loads 122 and 124 to the rest of the circuit 100. For example, a user may use the switch to turn on or off LEDs to provide more resistance to the circuit 100. Similarly, the user may use the switches to control the brightness of light provided by the circuit 100 during different portions of the growing cycles of plants growing under the influence of the LEDs driven by the circuit 100 by dimming or increasing the brightness of the LEDs or bulbs. In some examples, the user may use the switches to control the spectrum of light provided by the circuit 100 by switching on different bulbs (e.g., fluorescent, UV, etc.) or LEDs during different portions of the growing cycles of the plants growing under the influence of the LEDs driven by the circuit 100.

In some implementations, the switches may be connected to a controller that activates the switches at predetermined times or for predetermined periods of times. For example, the circuit may include a timer that controls a relay or other switch and can automatically switch on or off different AC loads. These switches can be timed for the growth cycles of plants, and can control, e.g., the timing of water pumping, heating, and/or light output. The controller may adjust the operation of the circuit 110 in response to user input indicating that plants growing under the influence of the LEDs driven by the circuit 100 have entered a different stage of growth. In addition, or as an alternative, the controller may adjust the operation of the circuit 100 in response to data from sensors that measure, e.g., temperature, humidity, light intensity, soil moisture, water levels, and other parameters.

In some implementations, the AC loads 122 and 124 may include light sources that produce a spectrum different from the LED D5. In some examples, the AC loads 122 and 124 may be UV bulbs, fluorescent bulbs, incandescent lamps, etc. that provide different light to plants growing under the influence of the circuit 100. When the switches are operated for each of the AC loads 122 and 124, the AC loads 122 and 124 may decrease the overall equivalent resistance between the modules 150, 160, which draws more current and increases, for example, the brightness of the LED D5 and LEDs in the element 146. In some implementations, the AC load 120 is a fan to cool the LEDs D5, 146 and at least one of the AC loads 122, 124 is a UV bulb. At an appropriate stage in a plant's growth, the UV bulb is connected, which increases the UV output to the plant as well as increase the current through the circuit 100 and increases the light output of the LEDs D5, 146.

In some examples, the AC loads 120, 122, and 124 may be placed in a position within the circuit 100 that is different from the one illustrated. For example, the AC load 120 may be placed in series between the full-bridge rectifier 130 and the live terminal 102. In some examples, the AC load 120 is placed in series between the full-bridge rectifier 110 and the neutral terminal 104. In some examples, one or more of the AC loads 120, 122, and 124 are omitted from the circuit 100. For example, the AC loads 122 and 124 may be omitted from the circuit 100.

In FIG. 1, variations may be made. For example, instead of the DC loads D5, 146 shown, one set of series-connected LEDs, or multiple sets of series-connected LEDs can be connected in parallel, can be connected as a DC load. The circuit 100 may thus include one, two, three, or more sets of one or more LEDs, where each set is connected to the DC nodes of one of the full-bridge rectifiers 110 and 130 in parallel to the other sets of LEDs. Other loads, including motors, fans, fuel cells, and other devices, may be used as loads in addition or as an alternative.

In some implementations, the circuit 100 is able to regulate power to the LEDs to without components such as specialized semiconductor driver chips, fly-back converters, constant current drivers, voltage regulators, operational amplifiers (op amps), transistors, power transistors, and other types of components that would add cost, complexity, and additional potential failure modes to the circuit. In some implementations, the modules 150, 160 can drive LEDs without using resistors. For example, the module 150 may omit the resistors R1, R2 and connect the LED D5 directly to the DC output of the rectifier after the fuse 106.

In some implementations, the circuit 100 can be combined with other circuits or circuit components, including: voltage regulators, operational amplifiers (op amps), transistors, etc. for different form factors with different functions. Where a single capacitor is shown in FIG. 1, multiple capacitors may be used, connected together in series and/or in parallel to achieve a desired capacitance value, or to provide other circuit characteristics.

Figure 2:
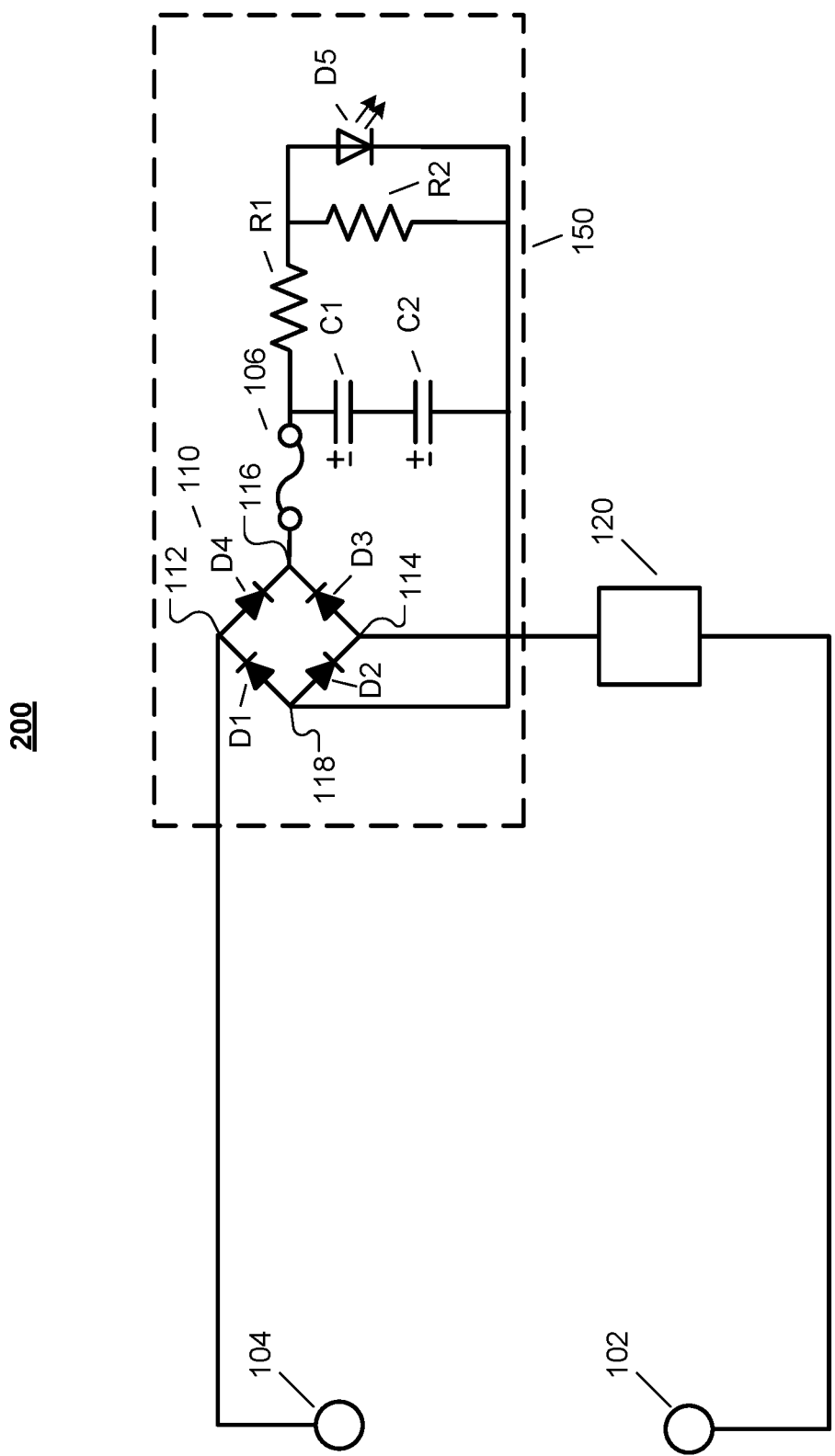
FIG. 2 is a diagram of an example circuit that can efficiently drive loads.

FIG. 2 is a diagram of an example driver circuit 200. The circuit 200 is includes a single rectifier 110, in a single module 150 that has the same characteristics discussed above. In this example, the circuit 200 is a circuit arranged to efficiently power LEDs. The circuit 200 is configured to turn on one or more LEDs to produce light. While the circuit 200 is illustrated and described as providing DC power to a load including LEDs, the circuit 200 may be used to provide power to other loads in addition to or instead of LEDs.

The circuit 200 shows an arrangement where a DC load, e.g., LED D5, and an AC load 120 can be driven in the same circuit 200. This example shows that the one or more AC loads can be effectively driven in series with a single diode-based rectifier 110 if desired. As discussed above, the AC load 120 provides resistance that limits the overall flow of AC current through the rectifier 110, which sets the appropriate DC voltage and current output through the DC load connected to the rectifier 110. Because the resistance of the AC load performs a useful function, such as running a fan, pump, light source, etc. the energy used in the AC load is not simply wasted. Further, the AC load and DC load are both powered with appropriate electrical characteristics without requiring LED driver chips or energy-dissipating resistors to bias the LED D5.

The AC load 120 may be any of a number of various loads. For example, the AC load 120 may be a motor, a fan that cools the circuit 200, a pump, additional LEDs, UV bulbs, fluorescent bulbs, etc.

Temperature has an important impact on soil conditions and plant growth. In some examples, the AC load 120 may be a heating pad. For example, the AC load 120 may be a heating pad that provides heat to roots of plants growing under the influence of the circuit 200. The length of coil in the AC load 120 may be selected to provide a specific resistance designed to drive the circuit 200 efficiently.

In some examples, the AC load 120 may include a potentiometer with an adjustable contact that forms an adjustable voltage divider. For example, the AC load 120 may be a linear, rotating, sliding, etc. potentiometer. The AC load 120 may be any of a number of variable or adjustable resistive loads. In some examples, the AC load 120 is a potentiometer placed between the full-bridge rectifiers 110 and 130. The AC load 120 may act as a resistive load to the circuit 200 in addition to limiting the energy used to drive the circuit 200. The AC load 120 allows a user to adjust the power delivered to the components of the circuit 200 from completely on to completely on, and various states in between. A user can adjust the brightness of an LED of the circuit 200 (e.g., the LED D5).

Figure 3:
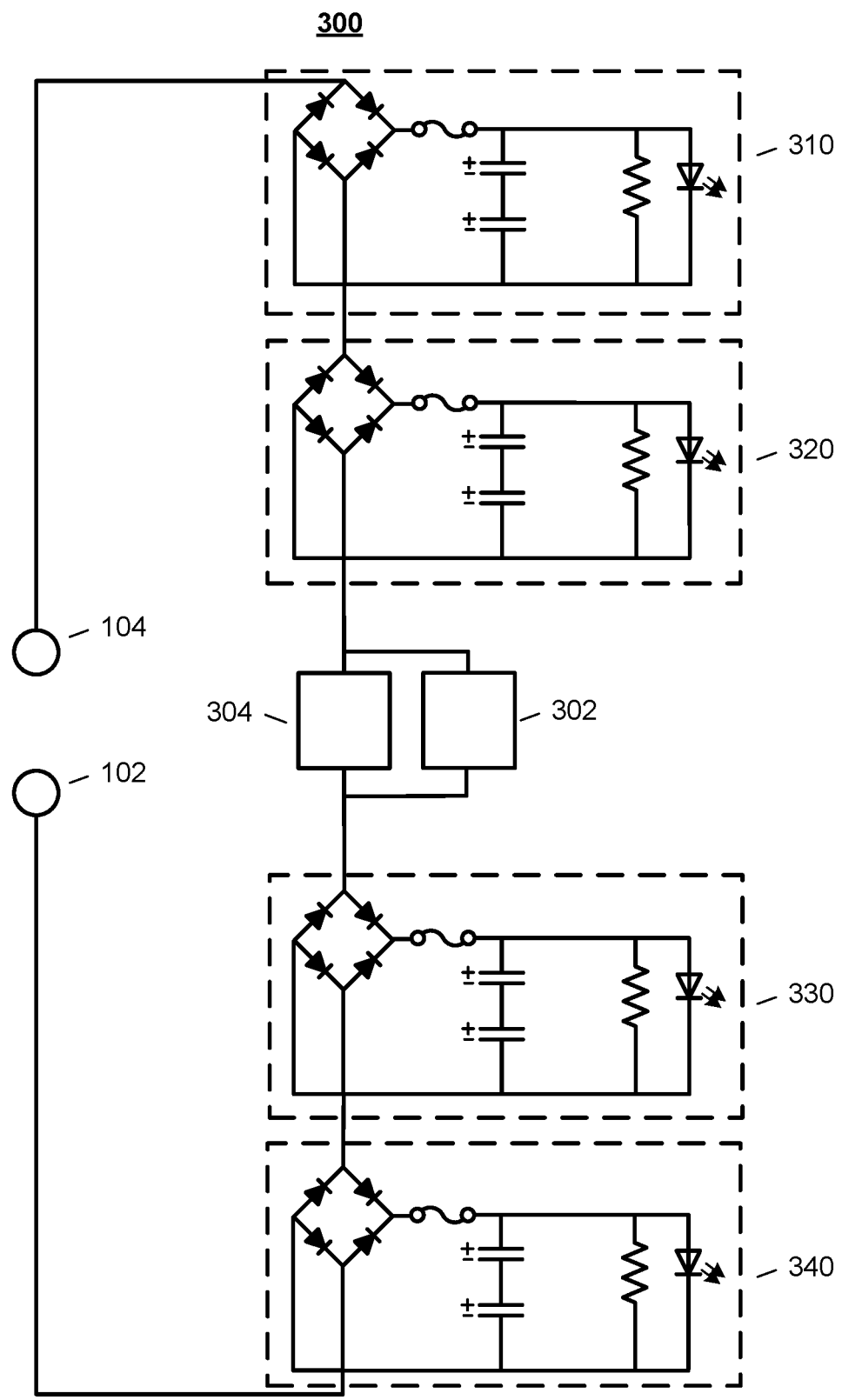
FIG. 3 is a diagram illustrating an example circuit having multiple self-contained modules that can efficiently drive loads.

FIG. 3 is a diagram illustrating an example circuit 300 having multiple modules that can drive separate loads. In this example, the circuit 300 uses multiple bridge rectifiers connected in series with each other so that the same alternating current (AC) current passes through each of the rectifiers. While the circuit 300 is illustrated and described as providing DC power to a load including LEDs, the circuit 300 may be used to provide power to other loads in addition to or instead of LEDs. The series arrangement of the full-bridge rectifiers distributes heat generation, facilitates repairs and replacements, and allows different arrangements of LEDs to be powered by separate rectifiers.

The circuit 300 includes modules 310, 320, 330, and 340. Each of the modules 310, 320, 330, and 340 may be a separate module that drives an LED similar to the modules 150 and 160 of FIG. 1. The multiple modules 310, 320, and 330 can distribute heat among many components, reducing the likelihood of overheating any one component or module.

In some implementations, each module is removable or replaceable to easily adjust or repair the circuit 300. In some examples, the circuit 300 provides a modular arrangement similar to that of a server rack. Each module of the circuit 300 may self-contained and may include electrical contacts to quickly couple and decouple the module from the rest of the circuit 300. Each module can be arranged so that replacing a module does not require replacing or adjusting the hardware of any other module.

The modules are arranged so that at least some types of failures in a module allow the remainder of the circuit 300 to continue operating. For example, if the fuse of the module 330 blows in one module, the associated LEDs in that module will turn off, but the LEDs of the other modules will continue producing light.

Additionally, users may add or remove modules as needed to customize the circuit 300. For example, the user may add additional modules similar to the modules 310, 320, 330, and 340 to provide additional light. In some examples, the user may add or remove modules different from the modules 310, 320, 330, and 340. For example, the user may add UV light producing modules during a growing period of plants growing under the influence of the circuit 300. In some examples, the user may replace the UV light producing modules with LED modules producing different spectra of lighting during a vegetative period of plants growing under the influence of the circuit 300. For example, different color temperatures of the light produced by the circuit 300 may be used. In some examples, the user may activate a cool (shorter wavelength) temperature light. In other examples, the user may activate a warm (longer wavelength) temperature light.

The centralized design of the circuit 300 provides a lightweight and flexible driver for any of a number of applications. This provides an advantage in applications such as growing plants using a light hood. The reduction in weight and the additional flexibility over traditional light hoods provides a user with a portable, easily customizable grow light solution.

The circuit 300 includes AC loads 302 and 304. The AC loads 302 and 304 provides resistance and biases the circuit 300. In some examples, the AC loads 302 and 304 are used to bias the circuit 300 to operate without the use of resistors. The AC loads 302 and 304 may each be any of a number of various loads. For example, the AC loads 302 and 304 may each be a motor, a fan that filters the air and cools the circuit 300, a pump, UV bulbs, fluorescent bulbs, etc.

For example, one or more of the AC loads 302 and 304 may be a fan for filtering the air and cooling the entire circuit 300, and the characteristics of the AC loads 302 and 304 may be chosen to set the speed of the AC loads 302 and 304.

In some examples, one or more of the AC loads 302 and 304 may be a heating pad. For example, one or more of the AC loads 302 and 304 may be a heating pad that provides heat to roots of plants growing under the influence of the circuit 300. The length of coil in the AC loads 302 and 304 may be selected to provide a specific resistance designed to drive the circuit 300 efficiently. For example, the length of coil in the AC loads 302 and 304 may be selected to drive the LED D5 to produce a particular lux (lumen per square meter).

In some examples, additional loads may be added in series with the AC loads 302 and 304. For example, additional modules may be added to the circuit 300 to provide additional impedance and spread heat generation.

In some examples, the circuit 300 includes a switch in series with each of the AC loads 302 and 304. By changing the position of the switches, a user can complete or break the portion of the circuit connecting the respective loads in parallel to the rest of circuit 300. The user may connect one, both, or neither of the AC loads 302 and 304 to the rest of the circuit 300. For example, a user may use the switch to turn on or off LEDs to provide more resistance to the circuit 300. In some examples, the AC loads 302 and 304 are a motor and a fluorescent light in parallel, and the user may switch on the fluorescent light during bloom time for plants growing under the influence of the circuit 300, and switch off the fluorescent light during vegetative time. In some examples, the AC loads 302 and 304 are a motor and a UV bulb, or a motor and a UV LED, etc.

Similarly, the user may use the switches to control the brightness of light provided by the circuit 300 during different portions of the growing cycles of plants growing under the influence of the LEDs driven by the circuit 300 by dimming or increasing the brightness of the LEDs or bulbs. In some examples, the user may use the switches to control the spectrum of light provided by the circuit 300 by switching on different bulbs (e.g., fluorescent, UV, etc.) or LEDs during different portions of the growing cycles of the plants growing under the influence of the LEDs driven by the circuit 300. The switches may be controlled by a user manually, or the switches may be connected to a controller that activates the switches at predetermined times or in response to certain conditions, as discussed above.

In some examples, the AC loads 302 and 304 may be UV LEDs, UV bulbs, fluorescent bulbs, incandescent lamps, etc. that provide different light to plants growing under the influence of the circuit 300. When the switches are operated for each of the AC loads 302 and 304, the AC loads 302 and 304 connected in parallel may draw more current and increase, for example, the power delivered to the LEDs of the modules 310, 320, 330, and 340 to increase light output.

In some examples, one or more of the AC loads may be a meter or measuring device that measures the amount of photosynthetically active radiation (PAR) provided. A user may use the results or readings from the meter to determine an optimal operating range. For example, a user may determine that the tomato plant they are growing needs additional PAR, and adjust characteristics of the circuit 300 to provide the additional PAR.

Figure 4A:
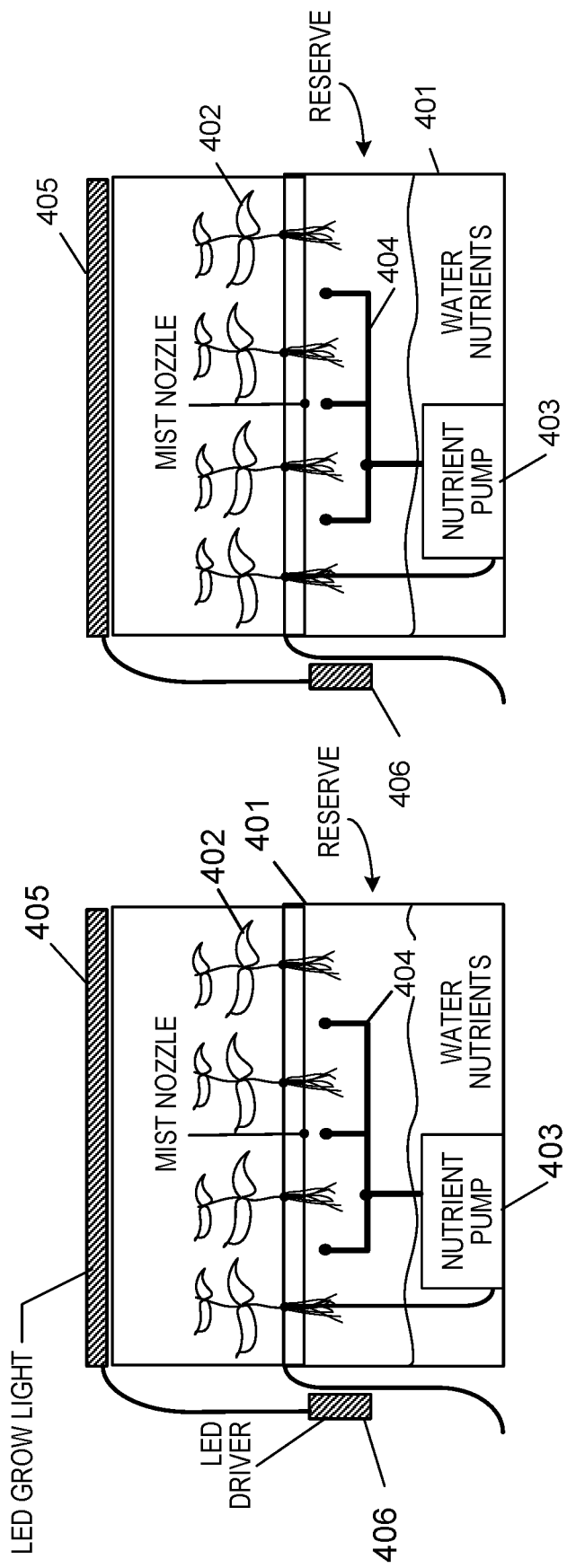
FIGS. 4A-4G are diagrams illustrating example devices and systems in which the circuits described with reference to FIGS. 1-3 can be housed.

FIG. 4A illustrates an example system 400 for the circuits described with respect to FIGS. 1-3. The system 400 may be an aeroponic misting cloner setup with built-in humidity dome LEDs. The system 400 shows reservoirs 401 containing water and nutrients for a number of plants 402. In some examples, the system 400 includes a nutrient pump 403 to circulate water and nutrients to the plants 402. The system 400 may include mist nozzles 404 that deliver water and/or nutrients to the plants 402. The system 400 may include a driver 406 that includes one of the circuits described with respect to FIGS. 1-3. For example, the LED driver 406 can drive LEDs 405 as the DC loads of one or more rectifiers. As discussed above, the LEDs 405 may include multiple types of LEDs that produce different output spectra. For example, a set of cool-toned LEDs and a set of warm-toned LEDs can be used together to provide balanced light output. The driver 406 can also supply power to the nutrient pump 403 to provide output at the mist nozzles 404. Depending on the type of pump used, the driver 406 may provide DC power or AC power as appropriate for the pump.

Figure 4B:
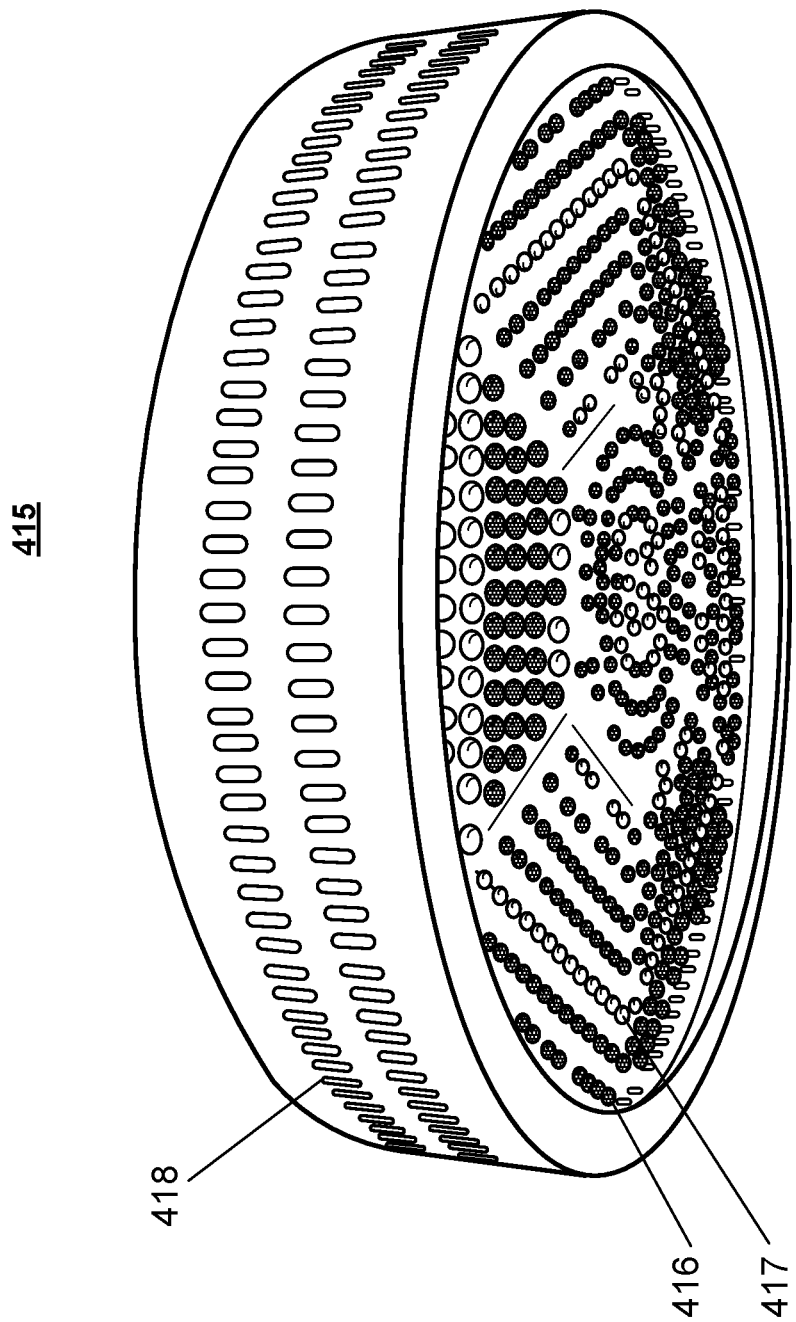

FIG. 4B illustrates another example device 415 including at least one of the circuits described with respect to FIGS. 1-3. The device 415 is an LED grow light that includes LEDs that produce different spectra of light. The different sets of LEDs are arranged in different patterns, for example, with a first set of LEDs 416 producing a first spectrum, and a second set of LEDs 417 producing a second spectrum. For example, the first spectrum may be visible light emitted by the first set of LEDs 416. The visible light may encourage stem growth, flowering and fruit production, and chlorophyll production. The first spectrum may include various colors of visible light, such as red, green, and blue light. The second spectrum may be ultraviolet (UV) light emitted by the second set of LEDs 417. The UV light may affect plant color, taste, and aroma, and promote accumulation of phenolic compounds. The sets of LEDs 416 and 417 can represent the LEDs or DC loads of the circuits described with respect to FIGS. 1-3, and may be driven by separate rectifiers that are coupled in series.

In some examples, the grow light 415 may produce more than two spectra. The different output spectra may be for different purposes with respect to plant growth, or may combine to produce a desired overall output balance. The grow light 415 also shown includes vents 418 permitting airflow. The grow light 415 can include one or more fans configured to filter the air and cool the LEDs 416 and 417 or other components of the grow light 415. The one or more fans may be driven as, for example, an AC load or a DC load of one of the circuits shown in FIGS. 1-3. The vents 418 allow air filtering as well as air intake and exhaust to cool circuits housed within the grow light 415.

Figure 4C:
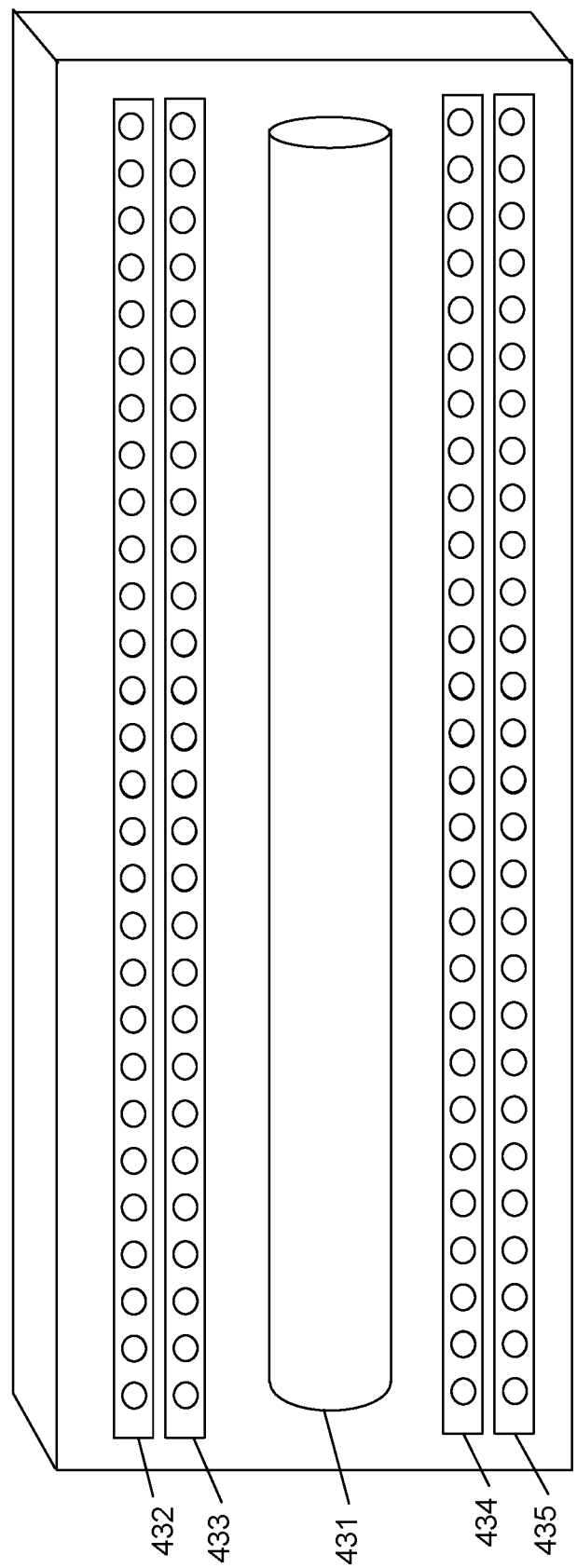

FIG. 4C illustrates another example device 430 that can include the circuits described with respect to FIGS. 1-3. The device 430 is a grow light hood that can be used to provide light to plants. The grow light hood 430 includes a fluorescent bulb 431, which may be driven as an AC load in series with rectifiers as discussed above. The grow light hood also includes multiple sets of LEDs 432, 433, 434, and 435, which can be driven as DC loads of rectifiers. In some implementations, each strip of LEDs is driven by a different rectifier, and in other implementations, two or more strips of LEDs are driven by the same rectifier. Similarly, at least some of the strips of LEDs can emit different spectra of light. For example, LEDs 432, 433 may produce a first spectrum, and LEDs 434, 435 may produce a different, second spectrum. As another example, LEDs 432, 434 may produce a first spectrum, and LEDs 433, 435 may produce a different, second spectrum. Other combinations of spectra are also possible. For example, each of the sets of LEDs 432, 433, 434, and 435 emit the same spectrum of light, or each strip of LEDs may include LEDs with different output spectra. When the strips of LEDs emit different spectra of light, each spectrum may have a different effect on growth of plants under the influence of the grow light hood 430. For example, the various sets of LEDs 432, 433, 434, and 435 may emit UV light and/or different colors of visible light. The fluorescent bulb 431 may produce visible light, or may produce UV light. The grow light hood 430 may optionally include one or more fans, driven as AC loads or DC loads, to filter the air and cool the components of the grow light hood 430.

Figure 4D:
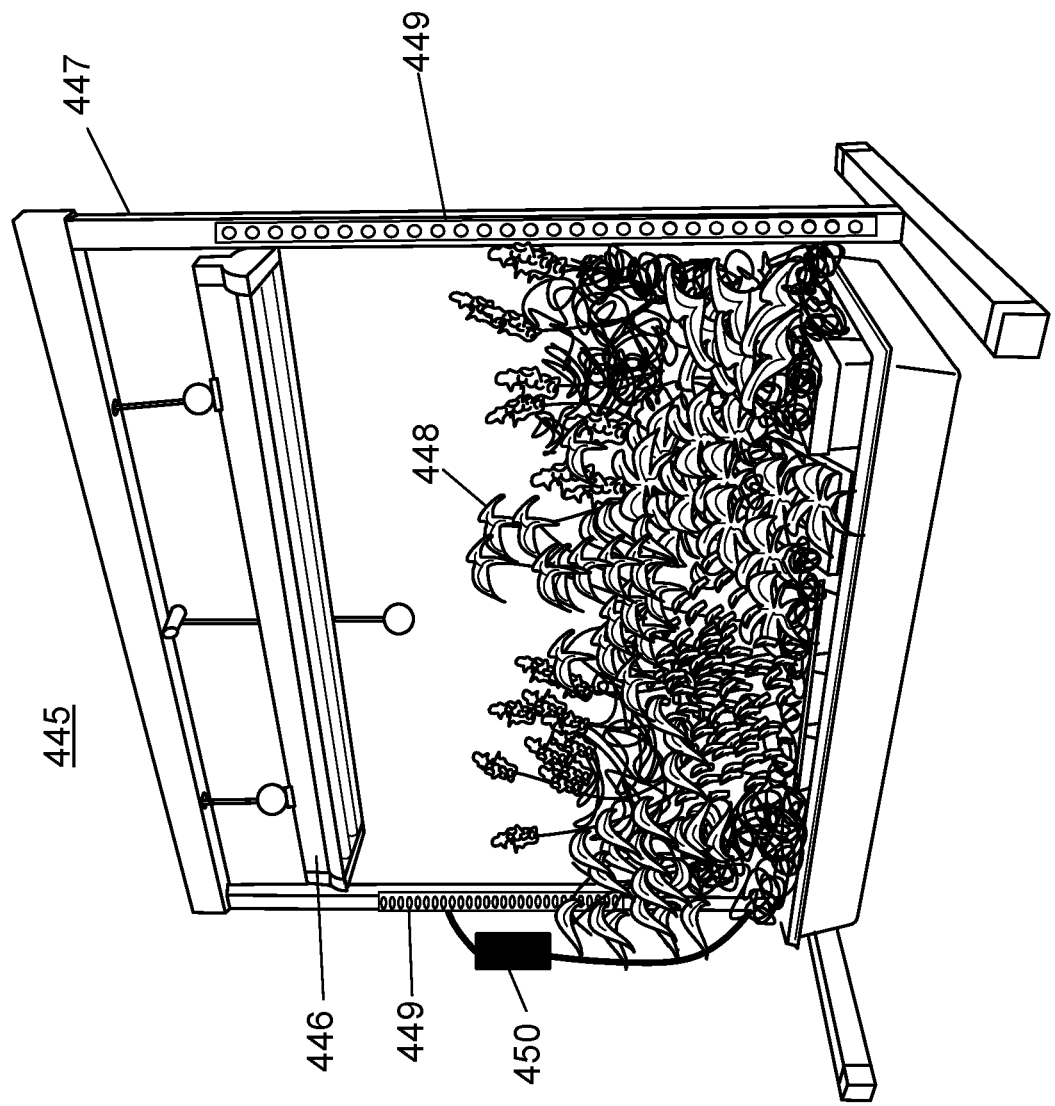

FIG. 4D illustrates another example system 445 that can use the circuits described with respect to FIGS. 1-3. The system 445 is a grow light hood and rack system that provides light to plants. The system 445 includes a light hood 446 attached to a frame 447. The frame 447 provides support for the light hood 446 and secures the light hood 446 an appropriate distance from plants 448. In some examples, the frame 447 is adjustable, and can be moved to vary the intensity of the light emitted by lights within the light hood 446. The system 445 includes a driver 450 that provides DC power to LEDs, and can also provide AC power to other components of the system 445. The light hood 446 can include LEDs, and may include one or more fluorescent lamps or other types of lamps driven as an AC load. Additional light may be provided by strips of LEDs 449 placed on the frame 447, for example, along vertical supports of the frame 447. For example, if additional intensity, coverage, or spectra of light was needed for improved plant growth, a user may add LEDs 449 in the form of LED strips, LED packs, etc. The light hood 446 and the LEDs 449 may be driven by the driver 450. In some examples, the driver 450 includes at least one of the circuits described with respect to FIGS. 1-3.

In some implementations, the system 445 includes a hydroponic bubbler, water pump, air pump, cooling fan, or other components. For example, the system 445 may include an airstone bubbler at the base, driven as an AC load or DC load by the driver 450, to aerate a nutrient solution for the plants 448. The bubbler may reduce the risk of root rot and provide other benefits.

Figure 4E:
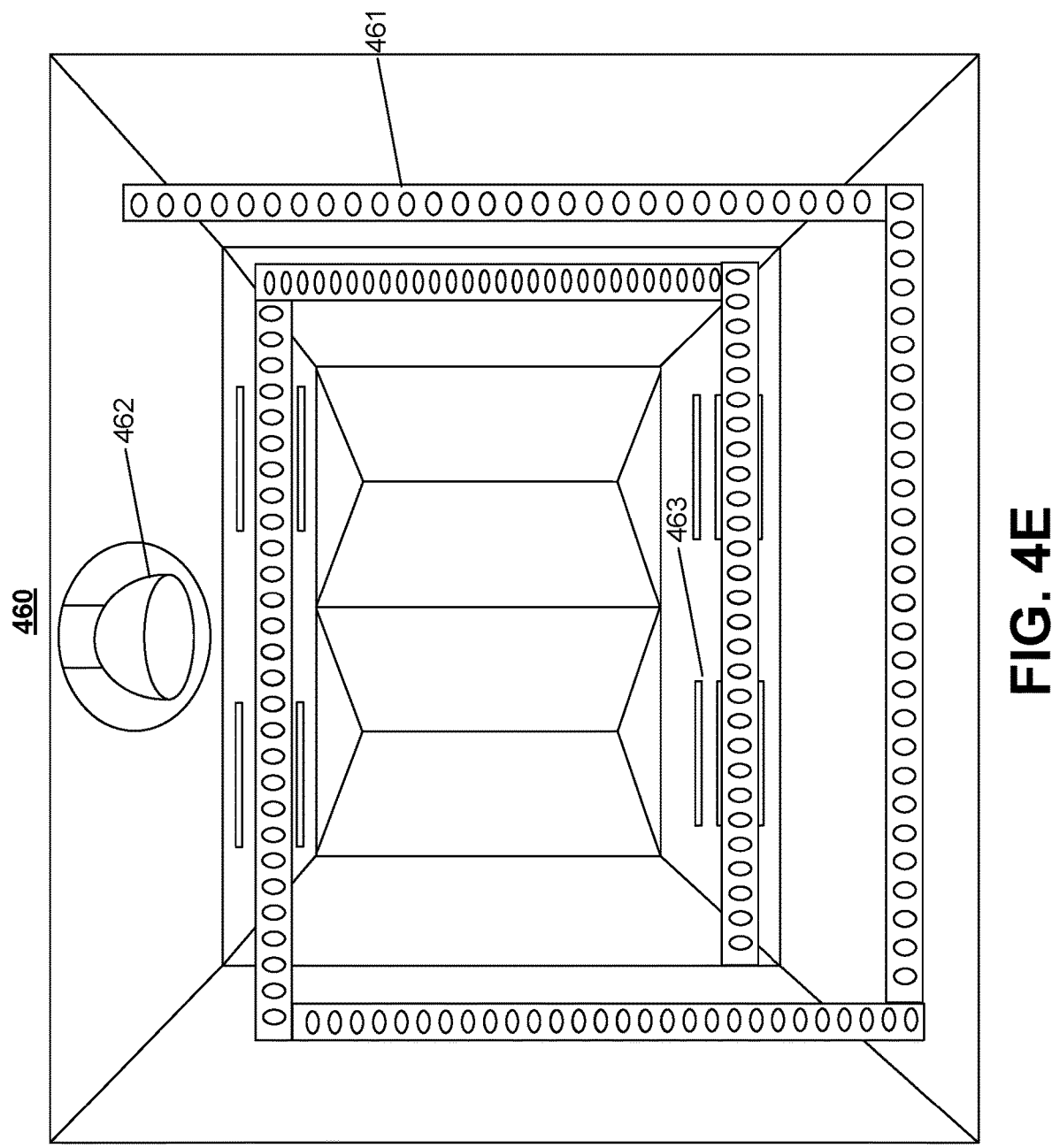

FIG. 4E illustrates another example device 460 for the circuits described with respect to FIGS. 1-3. The device 460 is a grow light hood that provides light to plants using one of the circuits described with respect to FIGS. 1-3. The grow light hood 460 includes LEDs in the form of LED strips 461 and a light bulb 462. In some examples, the light bulb 462 may be a lamp powered by AC power, and could emit UV light or visible light. In some examples, the light bulb 462 may be a high-intensity discharge lamp. For example, a mercury-vapor lamp (a type of high-intensity discharge lamp) with an appropriate induction driver may be used as the light bulb 462. Other types of high-intensity discharge lamps include metal halide lamps and high-pressure sodium lamps. The light bulb 462 may emit light of the same spectrum as the light emitted by the LED strips 461. In some examples, the light bulb 462 emits light of a different spectrum from the LED strips 461. In some examples, the LED strips 461 may emit different spectra of light, such as different colors of visible light and/or UV light.

The grow light hood 460 is also includes vents 463 to filter and circulate air. The vents 463 may provide filtering of the air and cooling for the light bulb 462 and the LED strips 461. In some examples, the vents 463 filter and circulate air and provide ventilation for plants grown under the influence of the grow light hood 460. The grow light hood 460 may also include a fan to filter and/or circulate air through the vents and onto the LEDs.

Figure 4F:
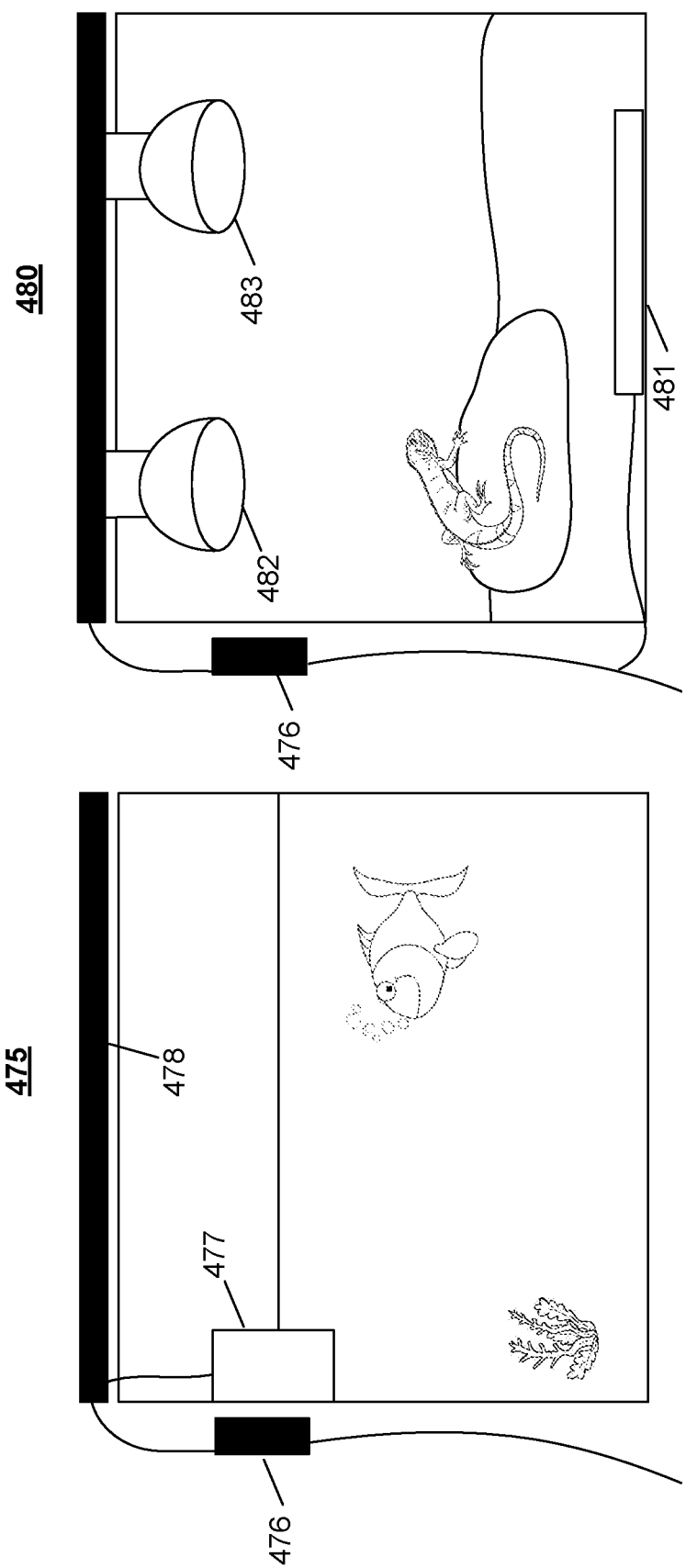

FIG. 4F illustrates another two example devices 475 and 480 for the circuits described with respect to FIGS. 1-3. The device 475 is an aquarium that provides filtration and light to aquatic life using one of the circuits described with respect to FIGS. 1-3. The device 480 is a terrarium that provides light and heating to terrestrial life using one of the circuits described with respect to FIGS. 1-3.

The aquarium 475 includes a driver 476 that controls different components of the aquarium 475. For example, the driver 476 is connected to aquarium filter assembly 477 and aquarium lights 478, which can be LEDs. The driver 476 may drive the filter assembly 477 to clean and aerate the water in the aquarium 475. In some examples, the filter 477 may also monitor water conditions, such as salinity, pH, oxygen, etc. The filter assembly 477 may be an AC load connected in series with rectifiers that provide DC power to LED lights. The driver 476 may power control circuitry to control the monitoring of the water conditions by the filter 477. In some examples, the aquarium lights 478 are controlled by the control circuitry to provide day-night cycles for aquatic life, encourage or control growth of algae, and maintain live plant populations.

The terrarium 480 also includes a driver 484. In some examples, the terrarium 480 includes a heating pad 481 and light bulbs 482 and 483. The heating pad 481 may be controlled by the driver 476 and may provide heating essential for cold-blooded creatures. For example, a lizard from a desert environment may require temperatures higher than room temperature of a house. The heating pad 481 may provide the additional heat for the lizard. In some examples, lighting may be provided by the light bulbs 482 and 483. For example, the light bulb 482 may be a basking light. The light bulb 483 may be a nighttime light. In some examples, the light bulbs 482 and 483 may be LEDs or may be incandescent or other types of lamps, and may emit infrared, visible, and/or UV light as appropriate for the environment.

The driver 484 may include the circuits described with respect to FIGS. 1-3. In some examples, the filter 477 and the heating pad 481 are AC loads of the circuits described with respect to FIGS. 1-3. In some examples the aquarium lights 478 and the light bulbs 482 and 483 are components, such as LEDs, of the circuits described with respect to FIG. 103.

Figure 4G:
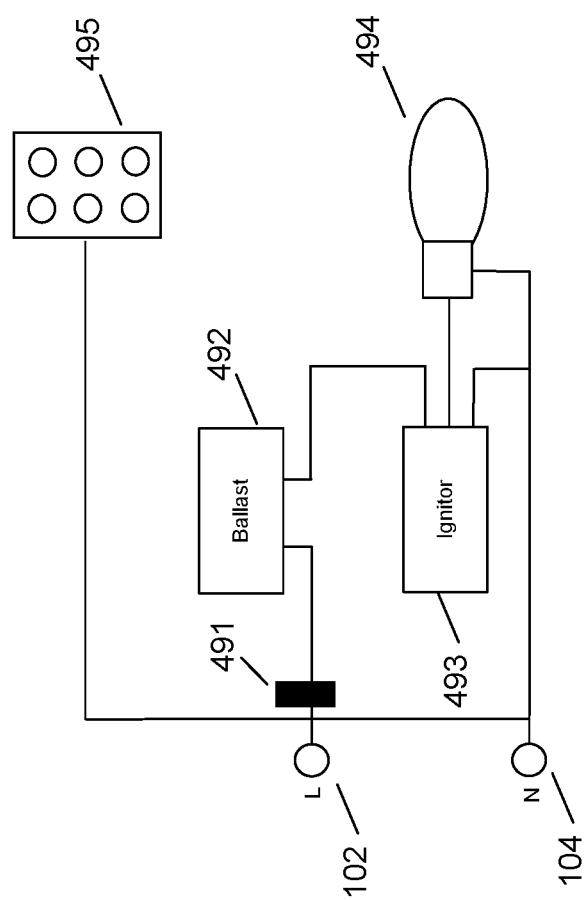

FIG. 4G illustrates another example device 490 for the circuits described with respect to FIGS. 1-3. The device 490 is a hybrid high-intensity discharge (HID) and LED lamp using one of the circuits described with respect to FIGS. 1-3. FIG. 4G shows a live terminal 102 of AC power, a neutral terminal 104 of AC power, and a driver 491 such as shown in one of FIGS. 1-3. The device 490 also includes a ballast 492, an ignitor 493, an HID lamp 494, and LED chips 495. The driver 491 may drive the HID lamp 494 and the LED chips 495. The LED chips may be components of the circuits described with respect to FIGS. 1-3, such as the diodes D5. For example, the driver 491 may provide DC power to the LED chips 495 and provide AC power to the HID lamp 494. The HID lamp 494 may be a mercury-vapor lamp or other type of high-intensity discharge lamp with an appropriate induction driver.

The ballast 492 may limit AC current for the HID lamp 494. The ignitor 493 may provide a brief, high voltage pulse or pulse train to breakdown gas between the electrodes of the HID lamp 494. The ignitor 493 could be a starter for the HID 494. The driver 491 is shown to be placed before the ballast 492, between the live terminal and the LED chip 495. The driver 491 is placed on the live terminal such that the ballast 492 is placed closer to the neutral line 104. For example, the ignitor can be placed in the circuit so that it is not placed between rectifiers on the AC line, but instead is placed adjacent the neutral line or the live line of the AC power source. In some implementations, the ignitor is placed to receive power from the live line of the AC power source before the driver 491.

The circuits described with respect to FIGS. 1-3 can be included in other devices and in other forms, including: PCBs, standalone circuits, a packaged circuit for use in more complex circuits, within a case or housing, etc.

Figure 5:
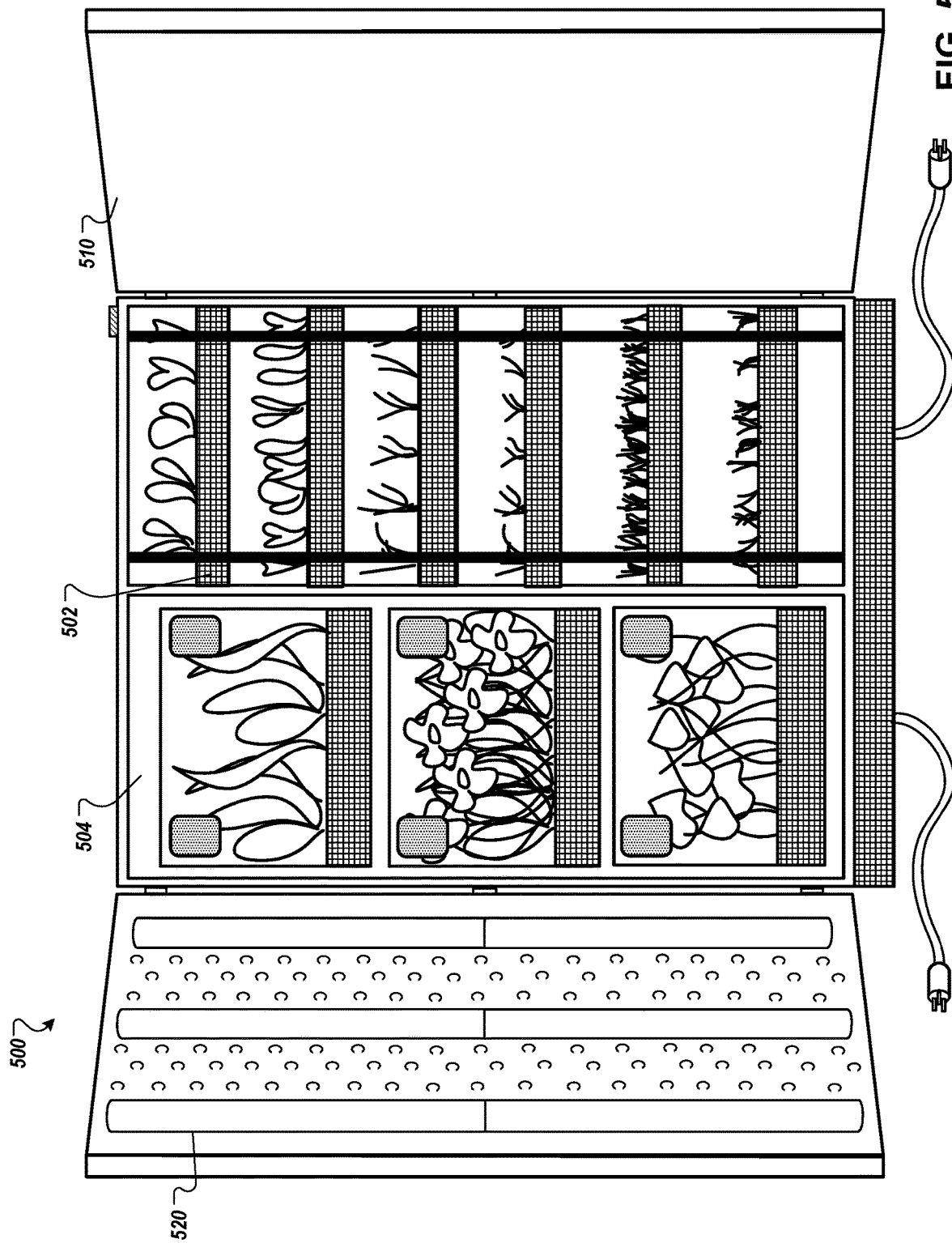
FIGS. 5-8 is a diagram showing an example of a device configured to house plants or other living things.

FIG. 5 illustrates an exemplary device that incorporates the devices as described with respect to FIGS. 1-4G. The enclosure 500 is a "living fridge," and houses life forms, such as plants, algae, aquatic life, and various other appropriate life forms within a structure. In some examples, the enclosure 500 can house life forms in one compartment and house food, such as the types of plants that the housed life forms eat, in a separate compartment. The plants, in this example, can be kept on shelves 502 within the inside housing 504. The shelves 502 can be rearranged so that the size for each section of the inside 504 of the enclosure 500 is customizable for the life form housed.

In some examples, there are no shelves 502, and instead there is just a terrarium or an aquarium. In some examples, the plants could be kept on the doors 510 like in refrigerators. In some examples, the shelves 502 are drawers that contain a medium that stores nutrition for housed life forms. For example, the medium could be soil, water, sponge, foam, peat moss, rockwool cubes, nutritious gel, or various other appropriate media. In some examples, the shelves 502 are sterile and can contain food such as meat. In some examples, the shelves 502 can be sterilized and the contents of the shelves 502 can be changed. The shelves 502 are removable, and can be replaced. For example, if a shelf 502 is full of lettuce, the shelf 502 can be removed and replaced with a second shelf containing seeds and soil.

In the illustrated example, there are lighting elements 520, such as the lighting elements described with respect to FIGS. 1-4G, that provide light to the interior of the enclosure 500. These lighting sources may be activated according to a timer of the enclosure 500, so that light is provided to plants and other contents of the enclosure 500 on a schedule, while the doors of the enclosure 500 are closed and while there may be no generated light escaping the enclosure 500. The lighting elements 520 can be placed on the door of the enclosure 500 or on other interior surfaces. Strips of LEDs can be placed along any appropriate surface of an interior of the enclosure 500. This can include the top, bottom, and/or sides of any of the compartments of the enclosure 500. LED strips can be placed along the interior of one or more doors of the enclosure 500. In some examples, the lighting elements can be on both doors of the enclosure 500, or the enclosure 500 could have just one door. By placing the lighting elements 520 on the door of the device or on a wall or walls of the enclosure 500, the shelves 502, or drawers or other containers, are made removable and can be rearranged and replaced to adjust the compartments within the enclosure 500.

LED strips providing different spectral outputs can be included, or individual LED strips can include LEDs that provide different spectral outputs. Other lighting elements besides LEDs, such as fluorescent bulbs, UV bulbs, and so on, can also be mounted on the interior of the enclosure 500. As discussed above, the activation of different lighting sources can be selectively varied in timing and intensity to tailor the light output to suit the plants or other life within.

In some examples, the lighting elements 520 can be placed on the shelves 502 or drawers, and the shelves 502 or drawers can be attached to the enclosure 500. The removable shelves 502, drawers, or other containers can include LED lights and a full-bridge rectifier, as a module in a modular system. The various shelves 502, each with a modular lighting and rectifier element, can include power connectors that connect in series to other modules when the shelves 502 are placed in the enclosure 500.

The enclosure 500 can be plugged in to external power and can be run like a general home appliance. The enclosure 500 can house multiple devices, in addition to the lighting elements 520, that control the conditions within the enclosure 500. For example, devices such as a humidifier, a mister, a heater, a fan, a carbon filter, a HEPA filter, a water filter, or various other devices that can control environmental factors within the enclosure 500 can be housed within the enclosure 500. For example, the enclosure 500 can be self-watering and have an automatic system that waters the plants housed within the enclosure 500 on a timer. Each of the devices can be a load as described above with respect to FIGS. 1-4G, and can be controlled separately. In some examples, the enclosure 500 can have a separate power source for each of the devices. In some examples, each of the devices can also be powered by a single power source as described with respect to FIGS. 1-4G. In some examples, a separate power source is provided for each compartment of the enclosure 500 as defined by the shelves 502 or dividers as shown in the FIGS. 5-9. For example, vegetative plants can be housed on one side of the enclosure 500 and flowering plants can be housed on the other side of the enclosure 500 and the lighting elements and respective devices can be separately controlled.

The enclosure 500 can be hermetically sealed between compartments so that the climate conditions of one compartment do not affect those of a different compartment, and humidity and smells will not escape the compartments so that such environmental factors can be controlled. Factors such as the particular spectrum of light emitted by the lighting elements 520 can be controlled and varied on a compartment-by compartment basis so that the amount of light and the type of light provided to a compartment is customizable by the user of the enclosure 500. Methods of water delivery can be customized as well. For example, the enclosure 500 may be configurable so that one compartment receives a stream of water every two days while another compartment receives a mist twice a day. In some examples, the enclosure 500 may include programmable dispensers to vary an amount and type of nutrients added to the water provided to particular plants or particular compartments of the device.

Figure 6:
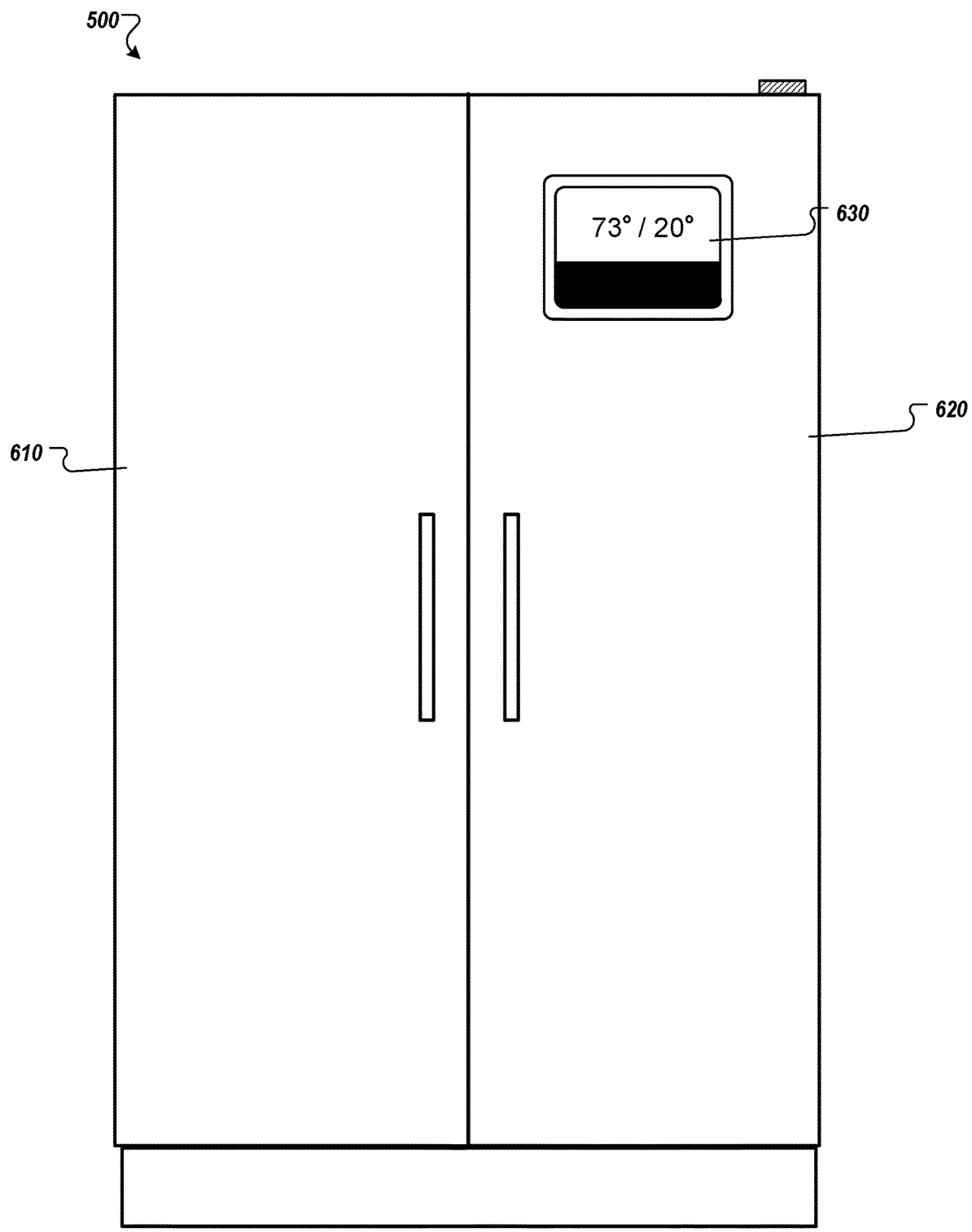

FIG. 6 illustrates a front view of the enclosure 500 of FIG. 5 with doors 610, 620 closed. The outside of the enclosure 500 can be customized based on customer preferences. For example, if the customer prefers, the enclosure 500 can be customized to look like enclosure 500, which looks like a refrigerator. Other exteriors may include a wardrobe-style exterior that includes wooden details and a wooden door. The enclosure 500 can be of various sizes. For example, the enclosure 500 can range in size from microwave-sized to walk-in sized. The enclosure 500 can include external features, such as grooves and ridges or interlocking features to connect one enclosure 500 to another. For example, implementations of the enclosure 500 can be compatible with each other such that the devices connect securely when stacked.

The enclosure 500 may include a digital display 630. The display 630 can be customized to provide various types of information, such as the temperature, humidity, oxygen levels, etc. of areas or compartments of the enclosure 500. The display 630 can display many different kinds of information, and can display multiple statistics at once. The enclosure 500 can also provide, on the display 630, an interactive user interface that allows the user to enter desired parameters for operating the enclosure 500. For example, the enclosure 500 may provide an interface for customizing, for the enclosure 500 as a whole or for individual compartments or zones individually, parameters such as: temperature, airflow, pressure, humidity, water dispensed, nutrients dispensed (as well as frequency and amount), light output intensity levels, light output duration or schedule, light spectrum (e.g., color content or relative intensity of different colors of light), and/or others.

In some examples, the enclosure 500 includes a timing element that controls devices within the enclosure 500. The timing element can be controlled by input received through the display 630. A control unit within the device can coordinate the actions of the enclosure 500 according to the inputs specified by a user.

Figure 7:
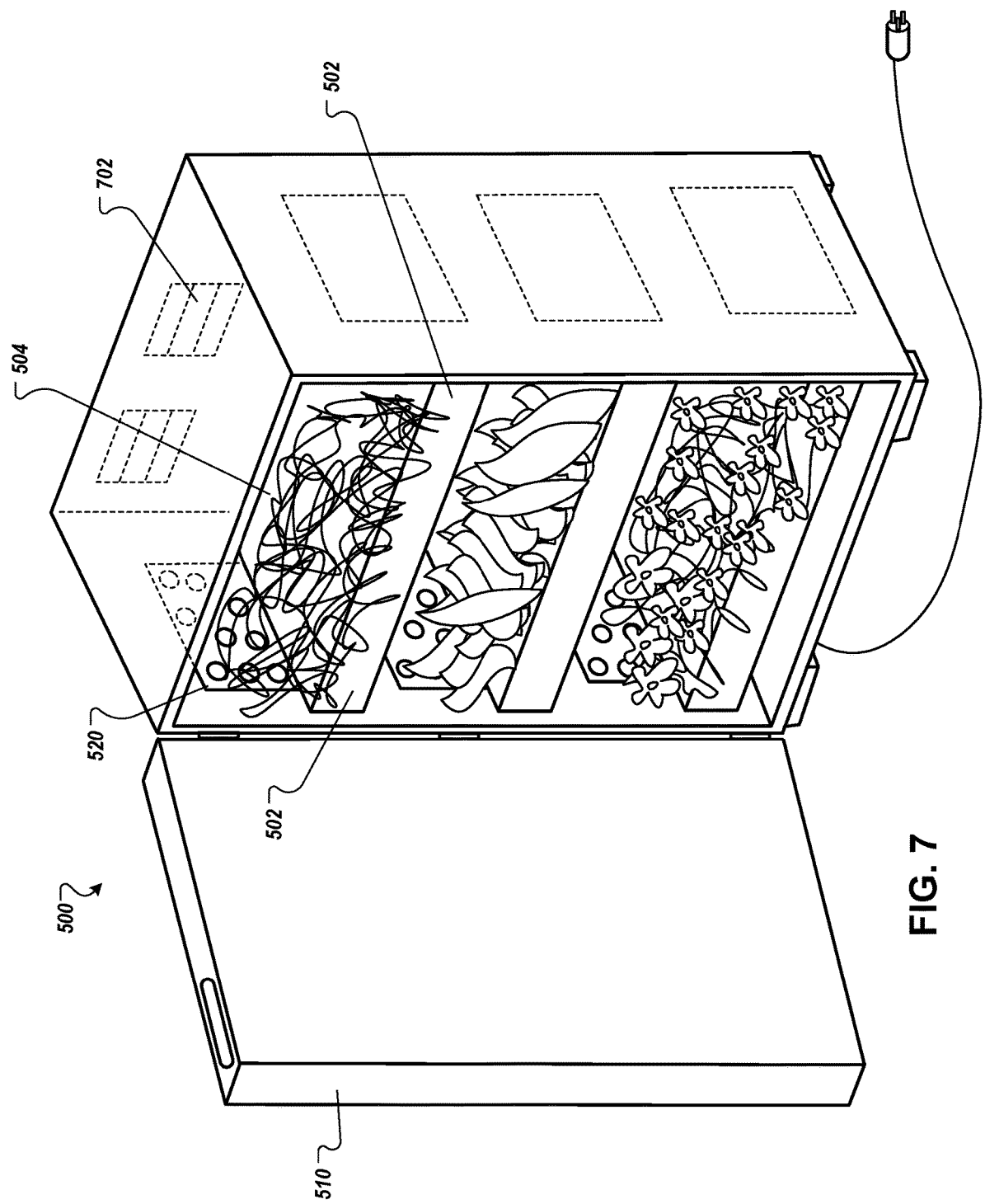

FIG. 7 shows a front perspective of a enclosure 500 similar to the device of FIG. 5. In this particular embodiment, the lighting elements 520 are placed on the sides of the inside 504 of the enclosure 500. The enclosure 500 is shown to have just one door 510, and each of the shelves 502 are sliding drawers that can be removed. The shelves 502 can also be permanently attached to the inside 504 of the enclosure 500. In this embodiment, there are vents 702 in the back of the inside 504 of the enclosure 500. These vents can allow heat, air, moisture, etc. to enter or escape from the enclosure 500 or filtering of the air within the enclosure 500.

Figure 8:
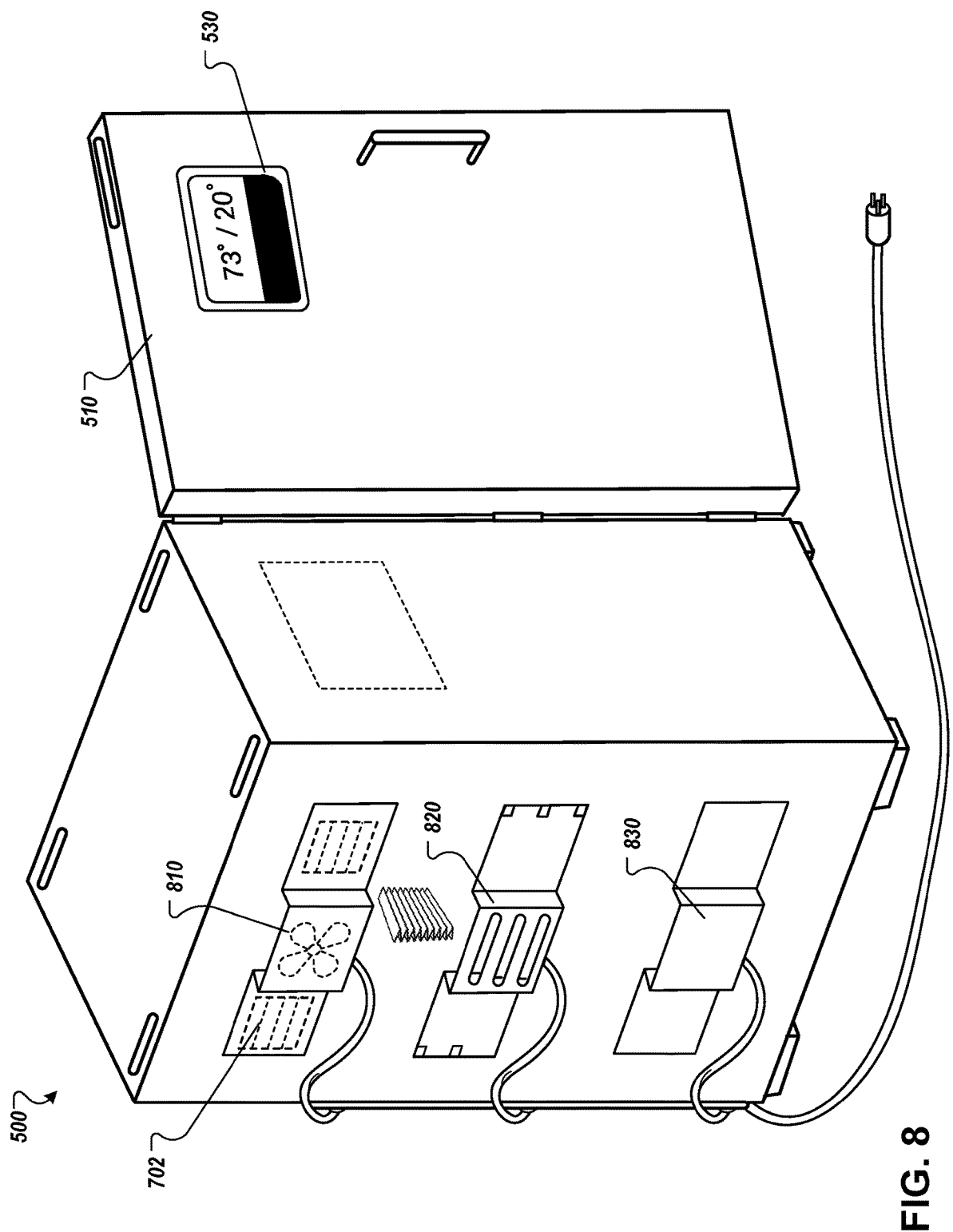

FIG. 8 shows a rear view of the device of FIG. 5. In this particular embodiment, it is shown that the enclosure 500 can include various loads to regulate the environment within the enclosure 500. For example, the device can include a fan 810 that filters the air and cools the inside of the enclosure 500 or circulates air within the enclosure 500. The enclosure 500 can include a heating element 820 that heats the inside of the enclosure 500. The enclosure 500 can include a motor 830 that powers various devices, such as the fan 810, the heating element 820, or a different load. The loads 810, 820, and 830 can each be loads as described with respect to FIGS. 1-4G, and can be integrated with the circuits of FIGS. 1-4G. In some examples, the device 800 includes one or more timing elements that control each of the loads 810, 820, and 830 such that the climate inside of the device 800 can be controlled. For example, there can be one timing element for each compartment of the device 800. Alternatively, a single control unit may direct the operation of different circuits or devices in the enclosure 500.

Figure 9:
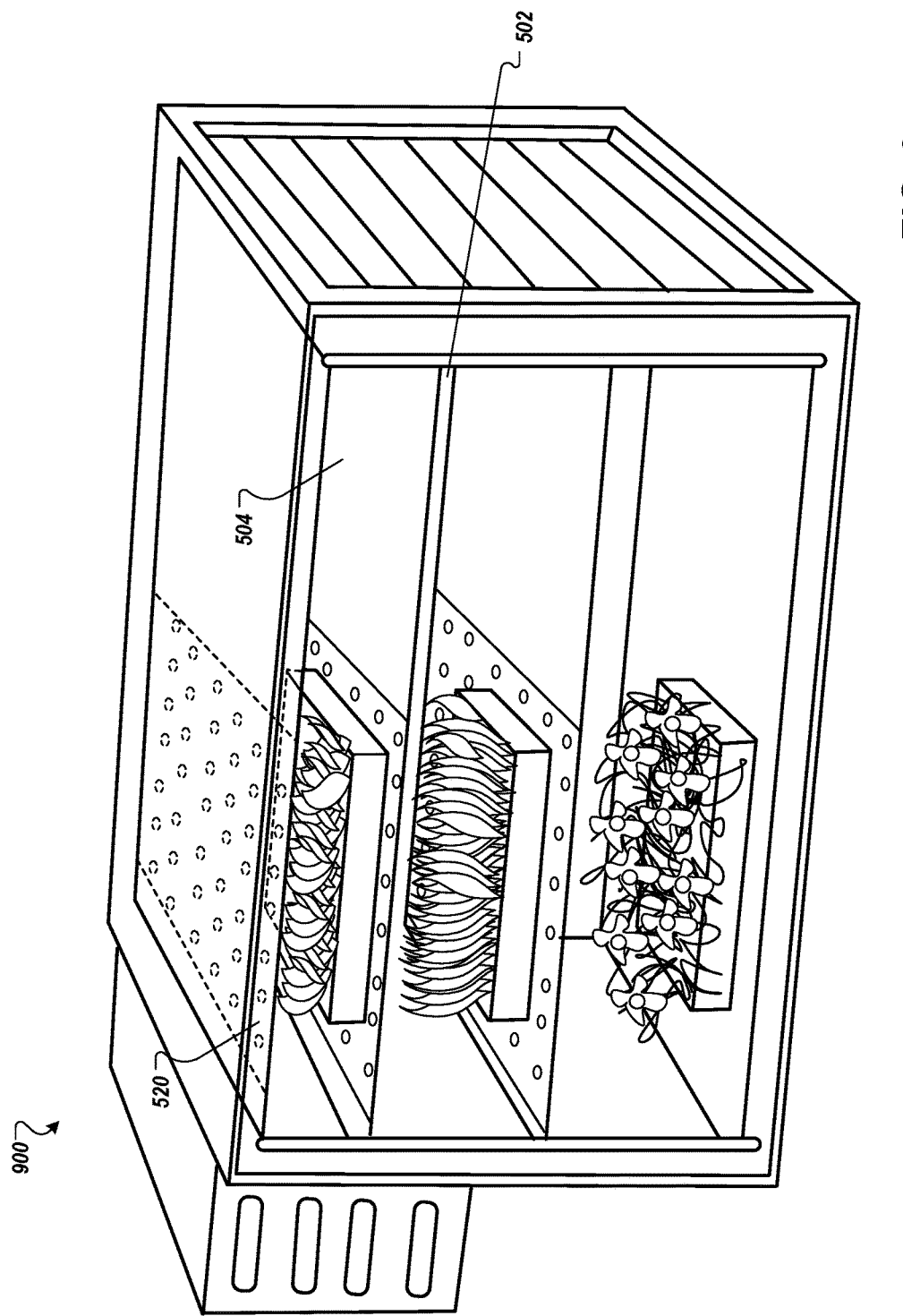
FIG. 9 is a diagram of another device configured to house plants or other living things.

FIG. 9 shows a different embodiment of the device of FIG. 5. In this particular embodiment, the device 900 includes horizontal racks that hold the life forms inside of the enclosure 500, such as plants. The embodiment 900 can be large enough for a human to walk in to, and can include a large door, such as a hangar door or a garage door, for example a sectional door with horizontal panels that are hinged together, that seals the device 900. In some examples, the device 900 does not include doors, but instead includes a heating element or cooling element placed to the side of the device 900 and lighting elements as described with respect to FIGS. 1-4G on both the top and bottom of the racks that hold the plants. In this particular embodiment, sides of the device 900 can be open. For example, the sides of the device 900 can be open such that air flows through the device 900.

A number of implementations have been described. Nevertheless, it will be understood that various modifications may be made without departing from the spirit and scope of the disclosure. For example, various operations discussed above may be used, with steps re-ordered, added, or removed.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single embodiment. Conversely, various features that are described in the context of a single embodiment can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As used herein, components that are coupled together may be electrically connected in a manner that allows electrical communication between them. Thus coupled components may be connected directly, e.g., by a wire, solder, circuit board trace, or other conductor, or indirectly through one or more other intervening circuit components.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single product or packaged into multiple products.

Particular implementations of the invention have been described. Other implementations are within the scope of the following claims. For example, the steps recited in the claims can be performed in a different order and still achieve desirable results.

What is claimed is:

1. An enclosure comprising:
   one or more doors that, when closed, seal the enclosure;
   at least one compartment that is sealed when the one or more doors are closed;
   a storage device configured to store a substance for sustaining one or more living things;

a dispenser configured to dispense the substance into the at least one compartment at a predetermined rate;
a power unit comprising:
> a first full bridge rectifier configured to receive power from an alternating current (AC) power source, the first full bridge rectifier having direct current (DC) output nodes;
> a second full bridge rectifier configured to receive power from the AC power source, the second full bridge rectifier having DC output nodes, wherein the second full bridge rectifier is coupled to receive AC power in series with the first full bridge rectifier;
> a first set of light emitting diodes coupled to the DC output nodes of the first full bridge rectifier; and
> a second set of light emitting diodes coupled to the DC output nodes of the second full bridge rectifier; and a control unit configured to control switching elements to selectively power on and power off different AC loads of the enclosure while the power unit remains powered on;
wherein each of the switching elements is configured to couple a corresponding AC load in series with the first full bridge rectifier and the second full bridge rectifier of the power unit; and
wherein at least one of the first set of light emitting diodes or the second set of light emitting diodes is configured to provide light within the compartment.

2. The enclosure of claim 1, wherein the first set of light emitting diodes has a first set of spectral output characteristics and the second set of light emitting diodes has a second set of spectral output characteristics different from the first set of spectral output characteristics.

3. The enclosure of claim 1, further comprising a load coupled in series between an AC node of the first full bridge rectifier and an AC node of the second full bridge rectifier, the load being arranged to be powered by AC power that flows between the AC node of the first full bridge rectifier and the AC node of the second full bridge rectifier.

4. The enclosure of claim 3, wherein the load comprises a motor, a pump, a fan, a light, a heating pad, a variable resistor, or a measurement device configured to measure photosynthetically active radiation.

5. The enclosure of claim 3, wherein the load comprises a fan configured to cool the first set of light emitting diodes and the second set of light emitting diodes.

6. The enclosure of claim 3, wherein the load comprises a UV light bulb, a fluorescent light bulb, or a high-intensity discharge lamp arranged to provide light within the enclosure.

7. The enclosure of claim 1, further comprising a display unit that displays a current value of an environmental characteristic within the enclosure.

8. The enclosure of claim 1, wherein the control unit, wherein the control unit controls the first set of light emitting diodes, the second set of light emitting diodes, and one or more AC loads connected in series with the first full bridge rectifier and the second full bridge rectifier.

9. The enclosure of claim 1, wherein the first set of light emitting diodes is coupled to an interior wall of the at least one compartment or the one or more doors.

10. The enclosure claim 1, wherein the dispenser is configured to dispense the substance at a user-programmable rate or interval.

11. The enclosure of claim 1, wherein the at least one compartment is defined by at least one divider that, when attached to the enclosure and when the one or more doors are closed, seals the compartment from another environmentally controlled compartment of the enclosure.

12. The enclosure of claim 1, wherein the enclosure includes multiple compartments that are each configured to independently receive different intensities and durations of light,
> wherein the control unit is configured to selectively activate the first set of light emitting diodes and the second set of light emitting diodes to provide light within the enclosure at a predetermined schedule or pattern while the one or more doors are closed.

13. The enclosure claim 1, wherein the enclosure includes a carbon air filter or a high-efficiency particulate air (HEPA) filter.

14. The enclosure of claim 1, wherein the one or more doors hermetically seal the enclosure.

15. The enclosure of claim 1, further comprising a watering system, a hydroponic mister, a fan, a heater, or an air conditioning unit configured to receive power in series with the first full bridge rectifier or the second full bridge rectifier.

16. An enclosure comprising:
one or more doors that, when closed, seal the enclosure;
at least one compartment that is sealed when the one or more doors are closed;
a storage device configured to store a substance for sustaining one or more living things;
a dispenser configured to dispense the substance into the at least one compartment at a predetermined rate;
a power unit comprising:
> a first full bridge rectifier configured to receive power from an alternating current (AC) power source, the first full bridge rectifier having direct current (DC) output nodes;
> a second full bridge rectifier configured to receive power from the AC power source, the second full bridge rectifier having DC output nodes, wherein the second full bridge rectifier is coupled to receive AC power in series with the first full bridge rectifier;
> a first set of light emitting diodes coupled to the DC output nodes of the first full bridge rectifier; and
> a second set of light emitting diodes coupled to the DC output nodes of the second full bridge rectifier; and a control unit configured to control switching elements to selectively power on and power off different AC loads of the enclosure while the power unit remains powered on;
wherein each of the switching elements is configured to couple a corresponding AC load in series with the first full bridge rectifier and the second full bridge rectifier of the power unit;
wherein the first set of light emitting diodes is at least partially arranged on an interior wall of the enclosure and is configured to provide light within the compartment; and
wherein the second set of light emitting diodes is at least partially arranged on an interior side of the one or more doors and is configured to provide light within the compartment when the one or more doors are closed.

17. The enclosure of claim 16, comprising at least two compartments, wherein the enclosure is configured to maintain a first compartment of the at least two compartments at a different temperature, humidity, light level, or other environmental condition than a second compartment of the at least two compartments, wherein the enclosure includes a display providing an interactive user interface configured to receive user-specified environmental settings for the at least two compartments, and wherein the control unit is configured to selectively activate the first set of light emitting diodes and the second set of light emitting diodes according to the user-specified environmental settings respectively specified for the at least two compartments.

18. The enclosure of claim 16, wherein the at least one compartment comprises a drawer.

19. The enclosure of claim 16, wherein the dispenser comprises a pump or a mister.

20. A method comprising:

providing an enclosure having (i) one or more doors that seal the enclosure when closed and (ii) at least one compartment that is sealed when the one or more doors are closed;

dispensing into the compartment a substance for sustaining one or more living things using a dispenser configured to dispense the substance into the at least one compartment at a predetermined rate;

providing power to a first set of light emitting diodes using a first full bridge rectifier configured to receive power from an alternating current (AC) power source, the first full bridge rectifier having direct current (DC) output nodes coupled to the first set of light emitting diodes;

providing power to a second set of light emitting diodes using a second full bridge rectifier configured to receive power from the AC power source, the second full bridge rectifier having DC output nodes coupled to the second set of light emitting diodes, wherein the second full bridge rectifier is coupled to receive AC power in series with the first full bridge rectifier, wherein at least one of the first set of light emitting diodes or the second set of light emitting diodes is configured to provide light within the compartment; and controlling, by a control unit of the enclosure, switching elements to selectively power on and power off different AC loads of the enclosure while a power unit comprising the first full bridge rectifier and the second full bridge rectifier remains powered on, wherein each of the switching elements is configured to couple a corresponding AC load in series with the first full bridge rectifier and the second full bridge rectifier of the power unit.

* * * * *